(12) United States Patent
Hawrami et al.

(10) Patent No.: US 12,344,786 B2
(45) Date of Patent: *Jul. 1, 2025

(54) THALLIUM-BASED SCINTILLATOR MATERIALS

(71) Applicant: Radiation Monitoring Devices, Inc., Watertown, MA (US)

(72) Inventors: Rastgo Hawrami, Watertown, MA (US); Lakshmi Soundara Pandian, Arlington, MA (US); Kanai S. Shah, Watertown, MA (US)

(73) Assignee: Radiation Monitoring Devices, Inc., Watertown, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/676,062

(22) Filed: Feb. 18, 2022

(65) Prior Publication Data

US 2023/0002674 A1    Jan. 5, 2023

Related U.S. Application Data

(63) Continuation of application No. 15/359,960, filed on Nov. 23, 2016, now Pat. No. 11,254,867, which is a continuation-in-part of application No. 14/988,957, filed on Jan. 6, 2016.

(60) Provisional application No. 62/151,642, filed on Apr. 23, 2015, provisional application No. 62/143,353, filed on Apr. 6, 2015.

(51) Int. Cl.
| | |
|---|---|
| *G01T 1/202* | (2006.01) |
| *C09K 11/61* | (2006.01) |
| *C09K 11/62* | (2006.01) |
| *C09K 11/77* | (2006.01) |
| *G01T 1/20* | (2006.01) |

(52) U.S. Cl.
CPC ...... *C09K 11/7773* (2013.01); *C09K 11/7719* (2013.01); *C09K 11/772* (2013.01); *C09K 11/7733* (2013.01); *C09K 11/7772* (2013.01); *G01T 1/2018* (2013.01)

(58) Field of Classification Search
CPC .................................................. G01T 1/2018
See application file for complete search history.

(56) References Cited

U.S. PATENT DOCUMENTS

| | | |
|---|---|---|
| 3,714,057 A | 1/1973 | Hofstadter et al. |
| 6,585,913 B2 | 7/2003 | Lyons et al. |
| 7,368,719 B2 | 5/2008 | Srivastava et al. |
| 7,655,919 B1 | 2/2010 | Shah et al. |
| 7,854,961 B1 | 12/2010 | Brecher et al. |
| 7,910,894 B2 | 3/2011 | Kraemer et al. |
| 8,415,637 B1 | 4/2013 | Shah et al. |

(Continued)

FOREIGN PATENT DOCUMENTS

RU    2066464 C1 *  9/1996

*Primary Examiner* — Mark R Gaworecki
(74) *Attorney, Agent, or Firm* — Wolf, Greenfield & Sacks, P.C.

(57) ABSTRACT

Scintillator materials, as well as related systems, and methods of detection using the same, are described herein. The scintillator material composition may comprise a Tl-based scintillator material. For example, the composition may comprise a thallium-based halide. Such materials have been shown to have particularly attractive scintillation properties and may be used in a variety of applications for detection radiation.

5 Claims, 21 Drawing Sheets

(56) References Cited

U.S. PATENT DOCUMENTS

| | | |
|---|---|---|
| 8,440,980 B2 | 5/2013 | Shah et al. |
| 8,575,553 B1 | 11/2013 | Shah et al. |
| 8,586,935 B2 | 11/2013 | Shah et al. |
| 8,779,365 B2 | 7/2014 | Williams |
| 9,599,727 B2 | 3/2017 | Ouspenski et al. |
| 11,254,867 B1 | 2/2022 | Hawrami et al. |
| 2005/0208290 A1 | 9/2005 | Patel |
| 2007/0131866 A1 | 6/2007 | Srivastava et al. |
| 2008/0001087 A1 | 1/2008 | Srivastava et al. |
| 2008/0131347 A1* | 6/2008 | Srivastava ............... G21K 4/00 423/263 |
| 2010/0163735 A1 | 7/2010 | Menge et al. |
| 2011/0024634 A1 | 2/2011 | Shah et al. |
| 2011/0024635 A1 | 2/2011 | Shah et al. |
| 2011/0223323 A1 | 9/2011 | Ohashi et al. |
| 2013/0320836 A1 | 12/2013 | Kanatzidis et al. |
| 2013/0341511 A1 | 12/2013 | Shah et al. |
| 2014/0008550 A1 | 1/2014 | Williams |
| 2014/0021410 A1 | 1/2014 | Carey et al. |
| 2014/0332689 A1 | 11/2014 | Van Loef et al. |
| 2014/0346400 A1 | 11/2014 | Pei et al. |
| 2014/0363674 A1 | 12/2014 | Zhuravleva et al. |
| 2015/0153463 A1 | 6/2015 | Shah et al. |
| 2015/0301197 A1 | 10/2015 | Wei et al. |
| 2016/0291169 A1 | 10/2016 | Hawrami et al. |

\* cited by examiner

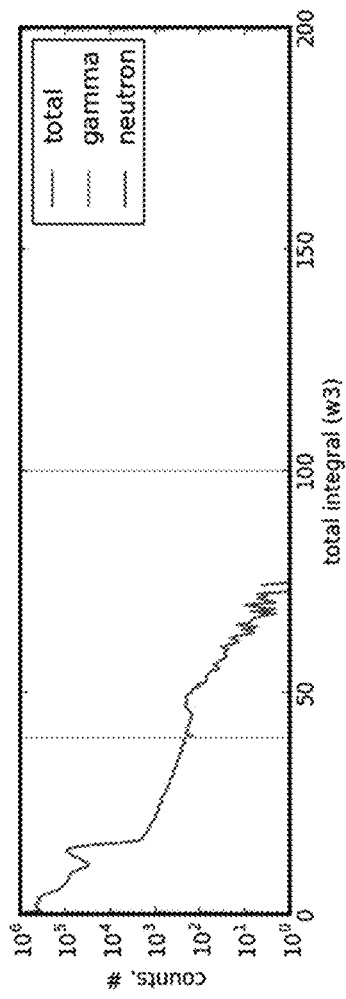
Fig. 5C
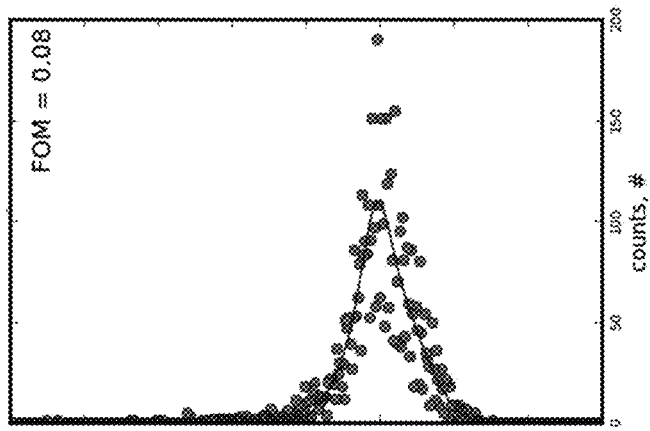
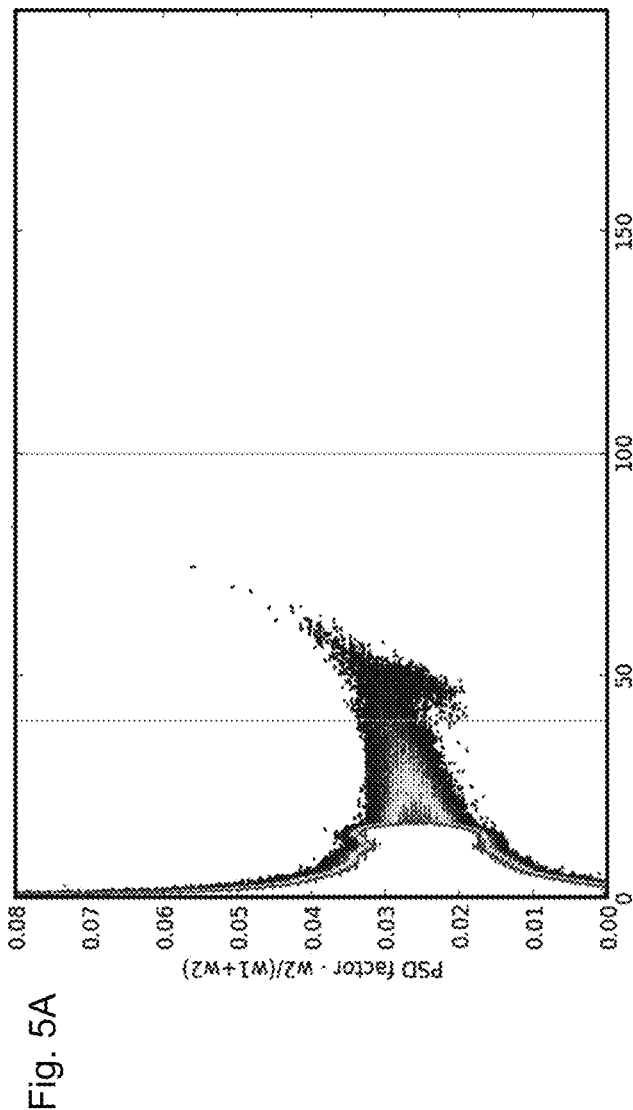
Fig. 5A
Fig. 5B

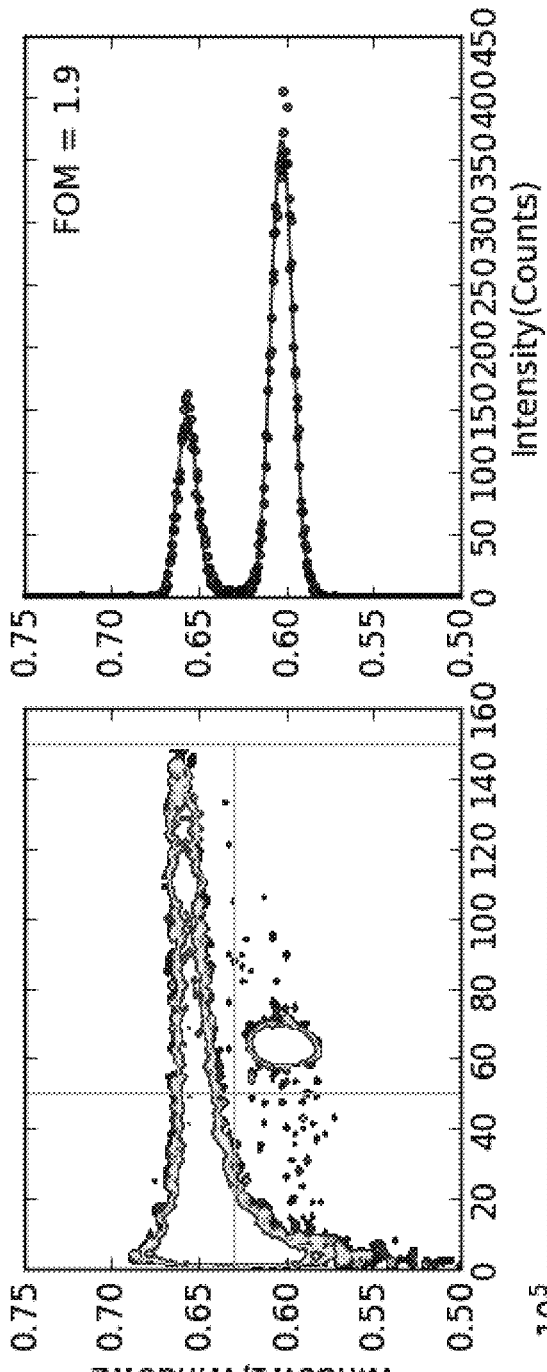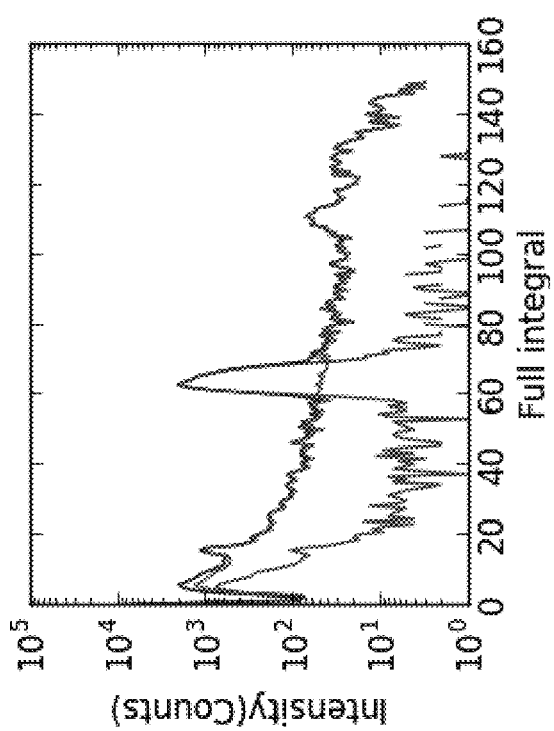
Fig. 10A
Fig. 10B
Fig. 10C

THALLIUM-BASED SCINTILLATOR MATERIALS

RELATED APPLICATIONS

This application is a continuation of U.S. application Ser. No. 15/359,960, filed Nov. 23, 2016, which is a continuation-in-part of U.S. application Ser. No. 14/988,957, filed Jan. 6, 2016, which claims priority to U.S. Provisional Application No. 62/143,353, filed on Apr. 6, 2015 and U.S. Provisional Application No. 62/151,642, filed Apr. 23, 2015, each of which is incorporated herein by reference in its entirety.

FIELD

Disclosed embodiments are generally related to compositions for use as scintillator materials and related methods and systems.

BACKGROUND

Scintillator materials may be used for the detection of radiation. Radiation detection is of major interest in a host of applications including, but not limited to, nuclear medicine, fundamental physics, industrial gauging, baggage scanners, nondestructive testing, nuclear treaty verification safeguards, nuclear nonproliferation monitoring, and geological exploration.

SUMMARY

Scintillator material compositions, and related methods and systems, are described herein.

In some embodiments, a scintillator material is provided. The scintillator material comprises a thallium-based halide composition.

In some embodiments, a system for detecting radiation is provided. The system comprises a detector including a scintillator comprising a thallium-based halide composition and a detector assembly coupled to the scintillator and configured to detect a light pulse luminescence from the scintillator as a measure of a scintillation event. The system also comprises a light detector assembly coupled to the scintillator to detect a light pulse luminescence from the scintillator.

In some embodiments, a method of radiation detection is provided. The method comprises providing a detection system. The detection system comprises a detector including a scintillator comprising a thallium-based halide composition. The detection system further comprises a light detection assembly coupled to the scintillator to detect a light pulse luminescence from the scintillator as a measure of a scintillation event. The method further comprises positioning the system such that a radiation source is within a field of view of the system so as to detect emissions from the source; and measuring a scintillation event luminescence signal from the scintillator with the detection assembly.

Other aspects, embodiments, and features of the invention will become apparent from the following detailed description when considered in conjunction with the accompanying drawings. The accompanying figures are schematic and are not intended to be drawn to scale. For purposes of clarity, not every component is labeled in every figure, nor is every component of each embodiment of the invention shown where illustration is not necessary to allow those of ordinary skill in the art to understand the invention. All patent applications and patents incorporated herein by reference are incorporated by reference in their entirety. In case of conflict, the present specification, including definitions, will control.

BRIEF DESCRIPTION OF DRAWINGS

FIGS. 5A-5C shows differentiation of gamma ray detection and neutron detection using pulse shape discrimination (PSD) by a $Tl_2LiLaBr_6$:Ce scintillator material sample.

FIGS. 10A-10C shows differentiation of gamma ray detection and neutron detection using shows pulse shape discrimination (PSD) by a $Tl_2LiYCl_6$:Ce scintillator material sample.

DETAILED DESCRIPTION

Figure 1:
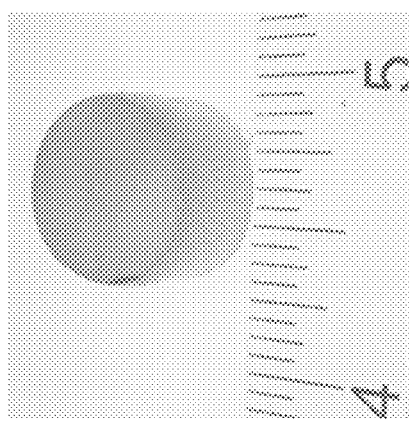
FIG. 1 shows a photograph of a $Tl_2LiLaBr_6$:Ce scintillator material crystal sample.

Scintillator materials, as well as related systems, and methods of detection using the same, are described herein. As described further below, the scintillator material composition may comprise a Tl-based scintillator material. For example, the composition may comprise a thallium-based halide and/or a thallium-based elpasolite. Such materials have been shown to have particularly attractive scintillation properties and may be used in a variety of applications for detection radiation.

In some embodiments, the thallium-based halide composition further comprises one or more elements selected from the group consisting of Li, Na, Cs, Li, Rb, and K. In some embodiments, the thallium-based composition further comprises one or more elements selected from the group consisting of Sr, Ba, Ca, and Mg. In some embodiments, the thallium-based composition further comprises one or more elements selected from the group consisting of Cl, Br, I and F. In some embodiments, the thallium-based composition further comprises one or more elements selected from the group consisting of Hf, Zr and Ti. In some embodiments, the thallium-based composition further comprises one or more elements selected from the group consisting of La, Ce, Pr, Lu, Y, Sc, Gd, Yb, Bi, In, B and Al. In some embodiments, the thallium-based halide composition further comprises one or more elements selected from the group consisting of La, Lu, Gd, Y, Ce and Bi.

In some cases, the thallium-based halide composition may include one or more halide element(s) such as F, Cl, Br, and I. For example, in some embodiments, it may be preferable for the halide element(s) to be Br and/or Cl.

The scintillator composition may have the general formula: (Tl, Cs, In, K, Na)$_2$(Li, Na, Cs, Tl)(La, Lu, Gd, Y, Ce, Bi)(F, Cl, Br, I)$_6$. In some cases, the thallium-based halide composition has the general formula: Tl$_2$(Li, Na, K, Tl)(La, Gd, Lu, Y, Bi)(Br, Cl, I)$_6$.

In some cases, the thallium-based halide composition comprises Tl$_2$LiLaBr$_6$ (TLLB) and may, for example, be doped with Ce. As described further below, TLLB may have particularly attractive scintillation properties including excellent energy resolution, proportionality and light yield. TLLB may also be suitable for gamma ray and/or neutron detection, as well as differentiation between gamma rays and neutrons using pulse shape discrimination (PSD). Furthermore, TLLB may have increased density and/or effective atomic number as compared to other elpasolite scintillator materials which may advantageously lead to increased stopping power. For example, the density of TLLB may be greater than 5 g/cm$^3$, e.g., on the order of 6 g/cm$^3$. The effective atomic number of TLLB may be greater than 60, e.g., 64. TLLB scintillator materials may be particularly well suited for PET applications. It should be understood, however, that TLLB materials may be well suited for use in other radiation detection applications.

In some cases, the thallium-based halide composition is Tl$_2$LiYCl$_6$ (TLYC) and may, for example, be doped with Ce. As described further below, TLYC may have particularly attractive scintillation properties including excellent energy resolution, proportionality and light yield. TLYC may also be suitable for gamma ray and/or neutron detection, as well as differentiation between gamma rays and neutrons using pulse shape discrimination (PSD). Furthermore, TLYC may have increased density and/or effective atomic number as compared to other elpasolite scintillator materials which may advantageously lead to increased stopping power. For example, the density of TLYC may be greater than 4 g/cm$^3$, e.g., on the order of 4.4 g/cm$^3$. The effective atomic number of TLYC may be greater than 60, e.g., 71.

In some cases, the thallium-based halide composition is Tl$_2$(Li, Na)BiBr$_6$ (e.g., Tl$_2$(Li$_{0.5}$Na$_{0.5}$)BiBr$_6$). As described further below, Tl$_2$(Li, Na)BiBr$_6$ may have attractive scintillation properties.

In some embodiments, the thallium-based halide composition has the general formula: (Tl, Cs, In, K, Na)$_3$(La, Lu, Gd, Y, Ce, Bi)(F, Cl, Br, I)$_6$. For example, the thallium-based halide composition comprises Tl$_3$LaBr$_6$. As described further below, Tl$_3$LaBr$_6$ may have attractive scintillation properties.

In some embodiments, the thallium-based halide composition has the general formula: (Tl, Cs, In, K, Na)$_2$(La, Lu, Gd, Y, Ce, Bi)(F, Cl, Br, I)$_5$. For example, the thallium-based halide composition can comprise Tl$_2$LaBr$_5$.

In some embodiments, the thallium-based halide composition can comprise Tl$_2$HfBr$_6$.

It should be understood that the scintillator compositions disclosed herein can include a dopant or a mixture of dopants. Dopants can affect certain properties, such as physical properties (e.g., brittleness, etc.) as well as scintillation properties (e.g., luminescence, etc.) of the scintillator composition. The dopant can include, for example, Ce (e.g., Ce$^{3+}$), Pr, Eu (e.g., Eu$^{2+}$), Sr, Ca, Ba, Mg, and Cd. In some cases, Ce may be preferred. In some cases, the composition is undoped.

The amount of dopant present will depend on various factors, such as the application for which the scintillator composition is being used; the desired scintillation properties (e.g., emission properties, timing resolution, etc.); and the type of detection device into which the scintillator is being incorporated. For example, the dopant may be employed at a level in the range of about 0.01% to about 20%, by molar weight. In certain embodiments, the amount of dopant is in the range of about 0.01% to less than about 20% (and any integral number therebetween), or less than about 0.1%, 1.0%, 5.0%, or 20% by molar weight.

In some embodiments, the thallium-based composition has the general formula: (Tl, Cs, Li, K, Rb, Na)(Sr—Ba—Ca—Mg)$_2$(F—Br—Cl—I)$_5$. In some embodiments, the thallium-based composition has the general formula: (Tl, Cs, Li, K, Rb, Na)(Sr—Ba—Ca—Mg)(F—Br—Cl—I)$_3$. In these embodiments, the compositions may be undoped or doped, e.g., with Eu$^{2+}$ or Ce$^{3+}$. For example, in some of these embodiments, the thallium-based composition may have the following general formulas: TlSrI$_3$; TlSr$_2$I$_5$; TlBaI$_3$; TlBa2I$_5$; TlCaI$_3$; TlCa$_2$I$_5$; TlMgI$_3$; TlMg$_2$I$_5$; Tl(Ca, Sr, Ba, Mg)(F, Cl, Br, I)$_3$; Tl(Ca, Sr, Ba, Mg)$_2$(F, Cl, Br, I)$_5$; (Tl, Li)(Ca, Sr, Ba, Mg)(F, Cl, Br, I)$_3$; (Tl, Li)(Ca, Sr, Ba, Mg)$_2$(F, Cl, Br, I)$_5$; (Tl, Cs)(Ca, Sr, Ba, Mg)(F, Cl, Br, I)$_3$; (Tl, Cs)(Ca, Sr, Ba, Mg)$_2$(F, Cl, Br, I)$_5$; (Tl, K)(Ca, Sr, Ba, Mg)(F, Cl, Br, I)$_3$; and (Tl, K)(Ca, Sr, Ba, Mg)$_2$(F, Cl, Br, I)$_5$.

In some embodiments, the thallium-based composition has the general formula: (Tl, Li, Cs, K, Rb, Na)$_2$(Hf, Zr, Ti)(Cl, Br, I, F)$_6$. In these embodiments, the compositions may be undoped or doped, e.g., with Pr$^{3+}$ or Ce$^{3+}$. For example, in some of these embodiments, the thallium-based composition may have the following general formulas: $Tl_2HfCl_6$; $Tl_2HfBr_6$; $Tl_2HfI_6$; $(Tl, Li)_2HfCl_6$; $(Tl, Li)_2HfBr_6$; and $(Tl, Li)_2HfI_6$.

In some embodiments, the thallium-based composition has the general formula: $(Tl, Cs, Li, K, Rb, Na)_2(Li, Na, Cs, K, Rb, Tl)(La, Ce, Pr, Lu, Y, Sc, Gd, Yb, Bi, In, Tl, B, Al)(Cl, Br, F, I)_6$. In these embodiments, the compositions may be undoped or doped, e.g., with Pr or Ce. For example, in some of these embodiments, the thallium-based composition may have the following general formulas: $Tl_2LiYCl_6$; $Tl_2LiYBr_6$; $Tl_2LiYI_6$; $Tl_2LiLaCl_6$; $Tl_2LiLaBr_6$; $Tl_2LiLaI_6$; $Tl_2Li(La—Y)(Br—Cl—I—F)_6$; and $Tl_2(Li, Na, Tl)(Y, La, Ce, Lu, Gd, Bi)(F, Cl, Br, I)$.

In some embodiments, the thallium-based composition has the general formula: $(Tl—Li—Cs—K—Rb—Na)_2(La—Ce—Pr—Lu—Y—Sc—Gd—Yb—Bi—In—B—Tl—B—Al)(Cl—Br—F—I)_5$. In these embodiments, the compositions may be undoped or doped, e.g., with Pr or Ce. For example, in some of these embodiments, the thallium-based composition may have the following general formulas: $Tl_2La(Cl, Br, I, F)_5$ and $(Tl—Li)_2(La, Ce, Lu, Y, Gd, Bi)(Cl, Br, I, F)_5$.

As can be understood from the formulas above, the thallium-based compositions may include one or more additional elements that substitute for thallium. For example, Cs, Li, K, Rb and/or Na may substitute for thallium on the thallium site (e.g., 1 site). In such embodiments, the thallium site includes at least 20 thallium; in some embodiments, at least 30% thallium; in some embodiments, at least 40% thallium; in some embodiments, at least 50% thallium; in some embodiments, at least 60% thallium; in some embodiments, at least 70% thallium; in some embodiments, at least 80% thallium; in some embodiments, at least 90% thallium; and, in some embodiments, only thallium is present on the thallium site.

In some embodiments, the lithium content of the composition is enriched to include a Li-6 content above that which is found in naturally occurring lithium sources. It should be understood, however, that not all compositions of the invention are enriched. Enrichment refers to a change through processing of a nuclear species mixture found on Earth or as naturally occurring so that the resultant material has a different mix of nuclear species. In naturally occurring sources of lithium, 93% of the lithium is in the form of Li-7 or $^7Li$, having an atomic weight of approximately 7 and includes a nucleus with three protons (defining the chemical species) and four neutrons. Approximately 7% of naturally occurring lithium is Li-6 or $^6Li$, which has an atomic weight of approximately six, including three protons and three neutrons. Although the chemical properties are substantially similar, the physical (weight) and nuclear properties are significantly different.

Thus, Li-6 enriched compositions of the present invention will include compositions where the Li-6 content is higher or above that which is found in naturally occurring lithium sources. Compositions can include lithium with a Li-6 content that is at least about 10% or higher, and will typically include lithium with a Li-6 content of about 50% or more, and in some instances about 80%, 90%, 95% or more (as well as any integral number in the specified ranges). For example, Li-6 may be present in an amount greater than or equal to about 10%, about 25%, about 50%, about 75%, about 90%, or about 95%. In certain embodiments, the amount of Li-6 is in the range of about 7.5% to less than about 100% (and any integral number therebetween).

The disclosed compositions may be prepared in any number of different forms. In some embodiments, the composition is an elpasolite. In some embodiments, the composition is in a crystalline form (e.g., monocrystalline). In some embodiments, the composition is formed as a crystalline structure including, for example, monoclinic, cubic, hexagonal, or any other appropriate crystalline structure. However, the composition can include other forms as well, and the selected form may depend, in part, on the intended end use of the scintillator. For example, a composition can be in a powder form. It can also be prepared in the form of a ceramic or polycrystalline ceramic. Other forms of compositions will be recognized and can include, but are not limited to, glasses, deposits, vapor deposited films, and the like. A crystal may have any suitable size and shape. Non-limiting examples of shapes include sheets, cubes, cylinders, hollow tubes, spheres, and the like.

Methods for making the disclosed compositions can include the methods described herein or any other appropriate technique. Typically during the manufacture of many types of scintillator compositions, the appropriate reactants are melted at a temperature sufficient to form a congruent, molten composition. The melting temperature depends on the identity of the reactants themselves (e.g., melting points of reactants), but is usually in the range of about 300° C. to about 1350° C. Non-limiting examples of possible crystal-growing methods include the Bridgman-Stockbarger method; Czochralski growth method, zone-melting growth method (or "floating zone" method), the vertical gradient freeze (VGF) method, and the temperature gradient method.

Following formation of the compositions, crystals may be processed using techniques and methods known to those of ordinary skill in the art. Such processes include cutting, polishing, and/or packaging (e.g., under an inert atmosphere). In addition, the compositions may be analyzed using methods and techniques known to those of ordinary skill in the art to determine the compositional make-up of the compositions, for example, using differential scanning calorimetry (DSC) and/or crystal structure (XRD).

The compositions, methods, and systems described herein may be employed for detecting radiation. In some cases, the radiation is gamma radiation and/or neutron radiation. In some cases, the compositions (e.g., TLLB, TLYC), methods, and systems may be employed to differentiate neutrons from gamma rays. The timing profile of a gamma-ray scintillation event differs compared to a neutron scintillation event. For incident gamma-rays, scintillation is very fast, including a fast light decay. The neutron scintillation event exhibits a relatively slower timing profile. The difference in the timing profile between gamma-ray scintillation events and neutron scintillation events can facilitate differentiation between gamma-ray detection and neutron detection. In particular, such differences enable gamma-ray detection and neutron detection to be differentiated using pulse shape discrimination (PSD) analysis.

PSD analysis, in general, involves comparing the luminescence signal pulse shape resulting from gamma-ray detection to the luminescence signal pulse shape resulting from neutron detection. In some embodiments, it may be advantageous to use PSD analysis over relatively long time periods to differentiate gamma-ray detection and neutron detection.

The compositions described herein can be used in systems for detecting radiation. The system may comprises a detector include a scintillator material comprising a composition as described herein coupled (e.g., optically coupled) to a light detector assembly (e.g., a light photodetector, an imaging device). In use, the detector detects energetic radiation (e.g., light pulse luminescence) emitted from a source (e.g., the scintillator material).

Non-limiting examples of light detector assemblies include photomultiplier tubes (PMT), photodiodes, CCD sensors, image intensifiers, and the like. Choice of a particular photodetector will depend in part on the type of radiation detector being fabricated and on the intended use of the device. In certain embodiments, the photodetector may be position-sensitive.

A data analysis system may be coupled to the detector. The data analysis system may include, for example, a module or system to process information (e.g., radiation detection information) from the detector/light detector assembly. The data analysis system may also include, for example, a wide variety of proprietary or commercially available computers, electronics, systems having one or more processing structures, or the like. The systems may have data processing hardware and/or software configured to implement any one (or combination of) the method steps described herein. The methods may further be embodied as programming instructions in a tangible non-transitory media such as a memory, a digital or optical recording media, or other appropriate device.

The systems themselves, which can include the detector and the light detector assembly, can be connected to a variety of tools and devices, as mentioned previously. Non-limiting examples include monitoring and detection devices (e.g., for nuclear weapons), physics research devices, well-logging tools, and imaging devices such as X-ray CT, X-ray fluoroscopy, X-ray cameras (such as for security uses), PET, and other nuclear medical imaging or detection devices. Various technologies for operably coupling or integrating a radiation detector assembly containing a scintillator to a detection device can be utilized with the presently disclosed materials, including various known techniques.

The systems may also be connected to a visualization interface, imaging equipment, or digital imaging equipment (e.g., pixilated flat panel devices). In some embodiments, the scintillator may serve as a component of a screen scintillator. For example, powdered scintillator material could be formed into a relatively flat plate, which is attached to a film, such as photographic film. Energetic radiation, e.g., gamma-rays and neutron, originating from a source, would interact with the scintillator and be converted into light photons, which are visualized in the developed film. The film can be replaced by amorphous silicon position-sensitive photodetectors or other position-sensitive detectors, such as avalanche diodes and the like.

In some embodiments, methods of radiation detection are provided. In some embodiments, a method of radiation detection comprises providing a detection system (e.g., as described here), positioning the detection system such that a radiation source is within a field of view of the system so as to detect emissions from the source; and measuring a scintillation event luminescence signal from the scintillator material with the detection assembly. In some embodiments, the detection system comprises a detector comprising a scintillator material as described herein (e.g., thallium-based halide composition), and a light detection assembly coupled to the scintillator material to detect a light pulse luminescence from the scintillator as a measure of a scintillation event.

The following examples are provided to illustrate certain embodiments described herein and not intended to be limiting.

Example 1

This example illustrates production and characterization of a $Tl_2LiLaBr_6$:Ce scintillator material sample.

A $Tl_2LiLaBr_6$:Ce crystal was grown using a Bridgeman growth technique. FIG. 1 shows a photograph of the $Tl_2LiLaBr_6$:Ce scintillator material crystal sample. The sample had a density of about 6 g/cm$^3$.

Figure 2:
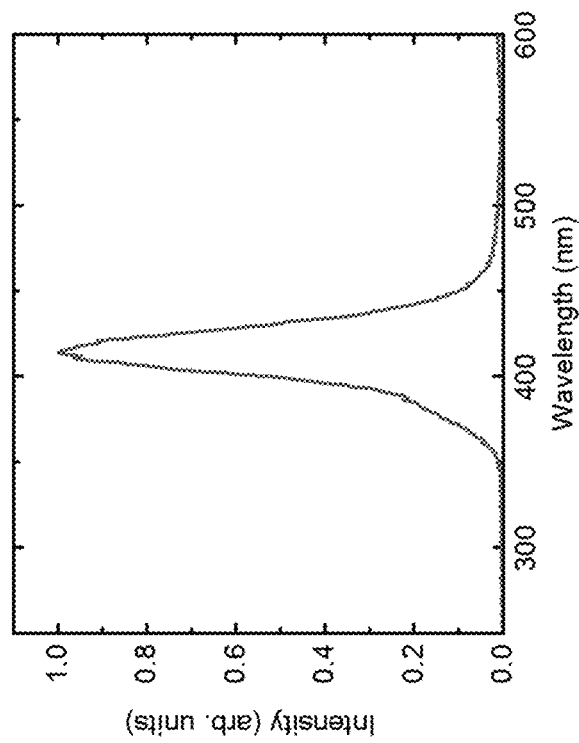
FIG. 2 shows an emission spectrum of a $Tl_2LiLaBr_6$:Ce scintillator material sample.
Figure 3A:
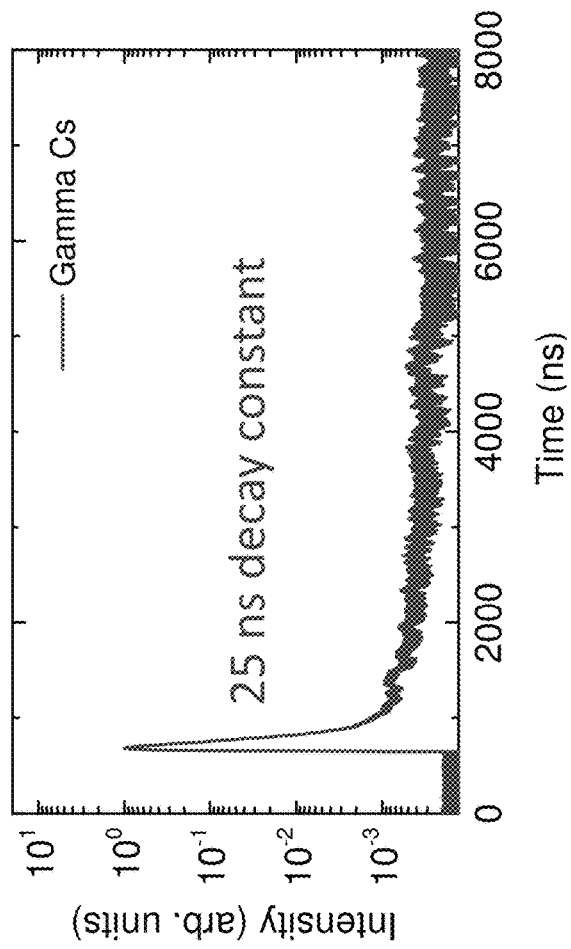
FIGS. 3A and 3B respectively shows decay time and timing resolution of a $Tl_2LiLaBr_6$:Ce scintillator material sample.
Figure 3B:
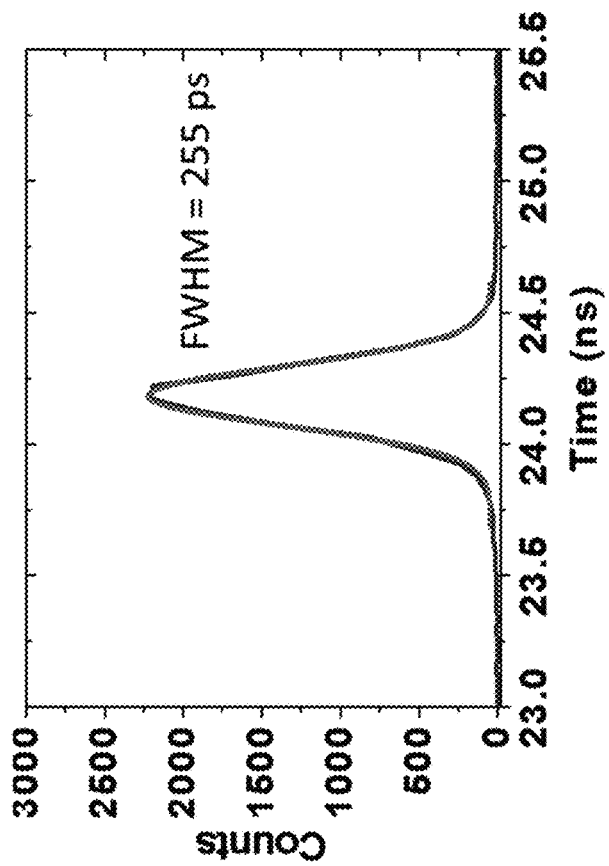
Figure 4:
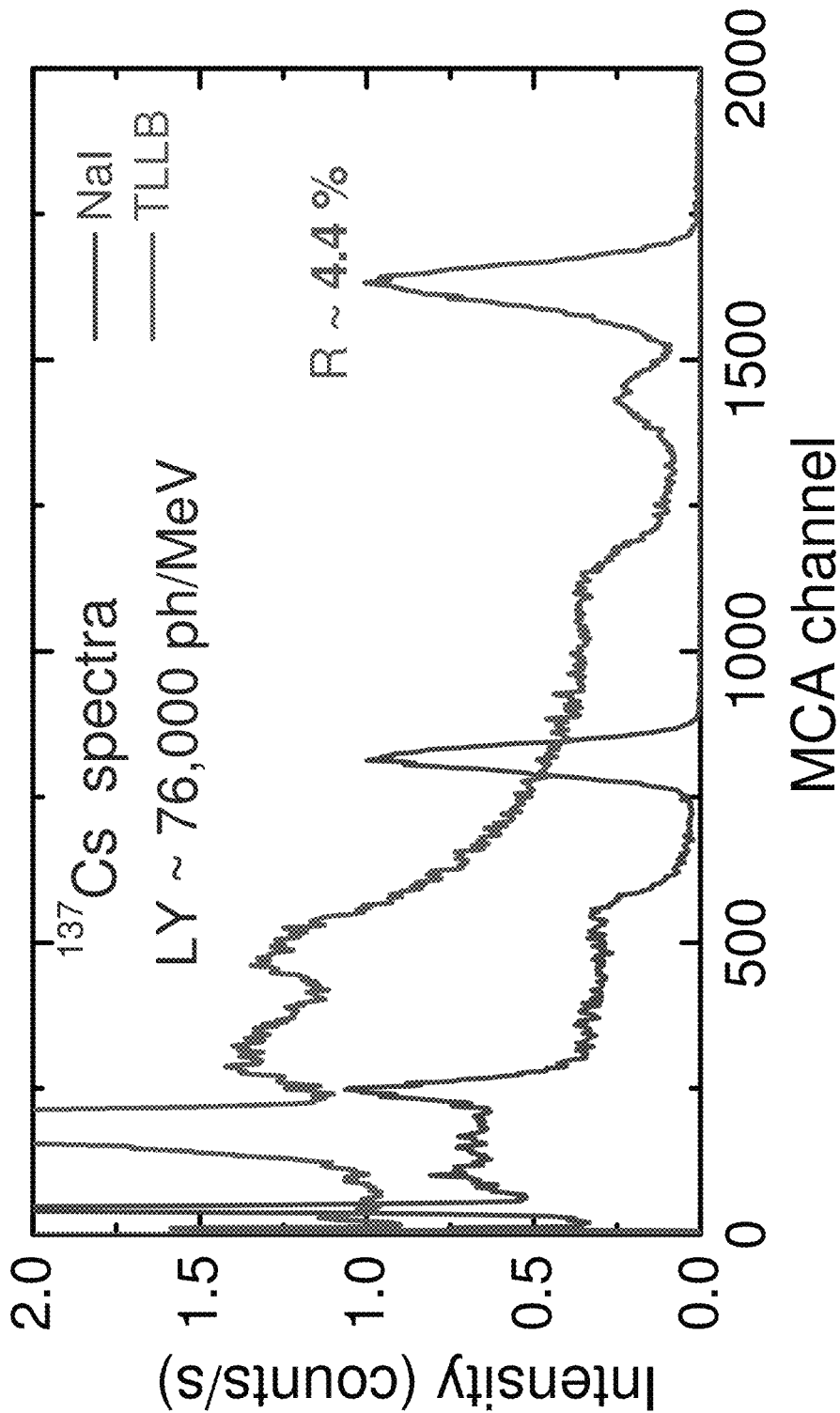
FIG. 4 shows light output and energy resolution of a $Tl_2LiLaBr_6$:Ce sample compared to NaI scintillator material.

Various scintillator properties were measured using the sample. FIG. 2 shows the emission spectrum of the $Tl_2LiLaBr_6$:Ce scintillator material sample. FIGS. 3A and 3B respectively shows decay time and timing resolution of the $Tl_2LiLaBr_6$:Ce scintillator material sample. FIG. 4 shows light output and energy resolution of the $Tl_2LiLaBr_6$:Ce sample compared to NaI scintillator material. FIGS. 5A-5C shows differentiation of gamma ray detection and neutron detection using pulse shape discrimination (PSD) by the $Tl_2LiLaBr_6$:Ce scintillator material sample.

The results show that TLLB has attractive scintillation properties including excellent energy resolution, proportionality and light yield. The results also show that TLLB is suitable for gamma ray and/or neutron detection, and can provide differentiation between gamma rays and neutrons using pulse shape discrimination (PSD).

Example 2

This example illustrates production and characterization of a $Tl_2LiYCl_6$:Ce scintillator material sample.

Figure 6:
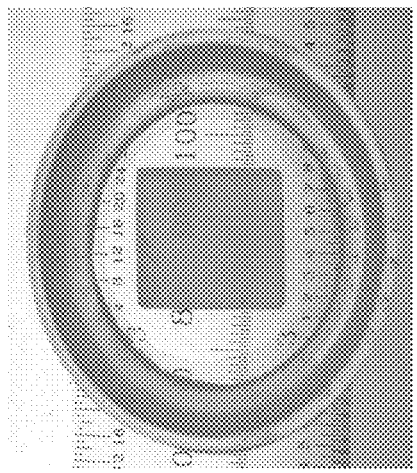
FIG. 6 shows a photograph of a $Tl_2LiYCl_6$:Ce scintillator material crystal sample.

A $Tl_2LiYCl_6$:Ce crystal was grown using a Bridgeman growth technique. FIG. 6 shows a photograph of a $Tl_2LiYCl_6$:Ce scintillator material crystal sample. The sample had a density of about 4.4 g/cm$^3$.

Figure 7:
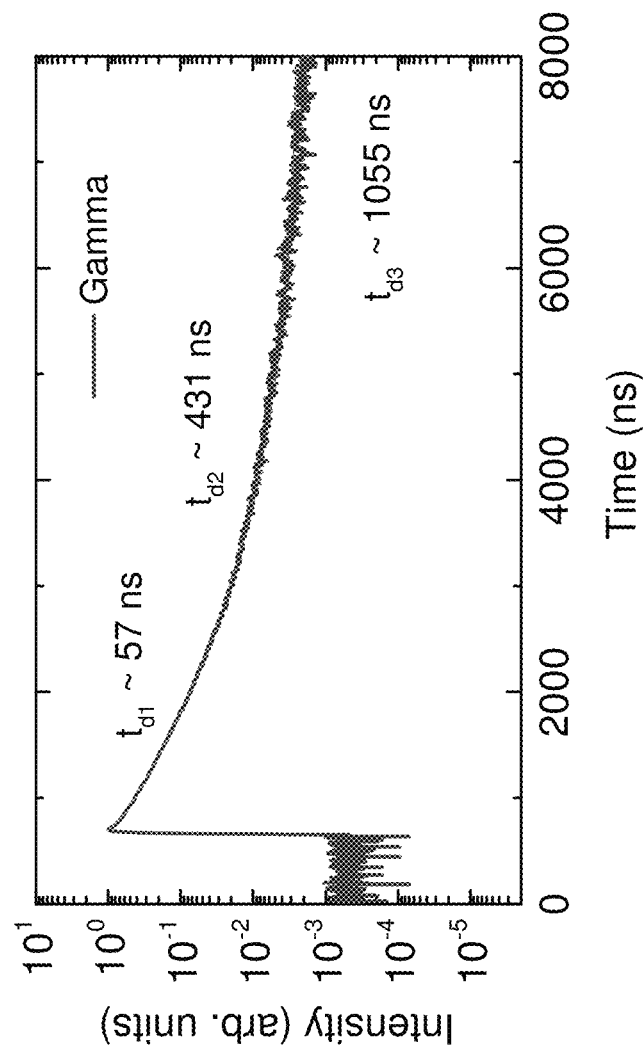
FIG. 7 shows a decay time of a $Tl_2LiYCl_6$:Ce scintillator material sample.
Figure 8:
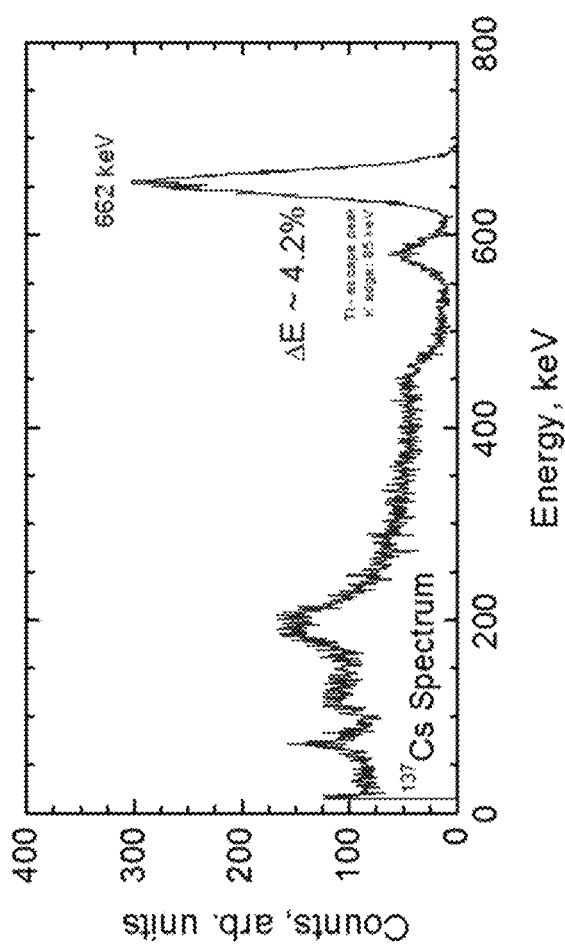
FIG. 8 shows light yield of a $Tl_2LiYCl_6$:Ce scintillator material sample.
Figure 9:
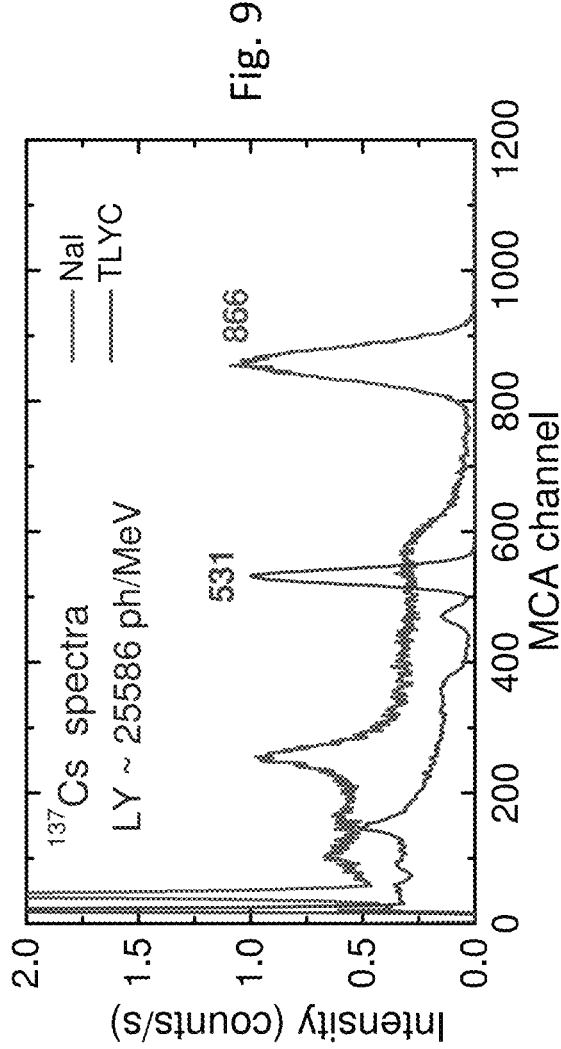
FIG. 9 shows energy resolution of a $Tl_2LiYCl_6$:Ce scintillator material sample compared to NaI scintillator material.

Various scintillator properties were measured using the sample. FIG. 7 shows a decay time of the $Tl_2LiYCl_6$:Ce scintillator material sample. FIG. 8 shows light yield of a $Tl_2LiYCl_6$:Ce scintillator material sample. FIG. 9 shows energy resolution of a $Tl_2LiYCl_6$:Ce scintillator material sample compared to NaI scintillator material. FIGS. 10A-10C shows differentiation of gamma ray detection and neutron detection using pulse shape discrimination (PSD) by the $Tl_2LiYCl_6$:Ce scintillator material sample.

The results show that TLYC has attractive scintillation properties including excellent energy resolution, proportionality and light yield. The results also show that TLYC is suitable for gamma ray and/or neutron detection, and can provide differentiation between gamma rays and neutrons using pulse shape discrimination (PSD).

Example 3

This example illustrates production and characterization of a $Tl_3LaBr_6$:Ce scintillator material sample.

Figure 11:
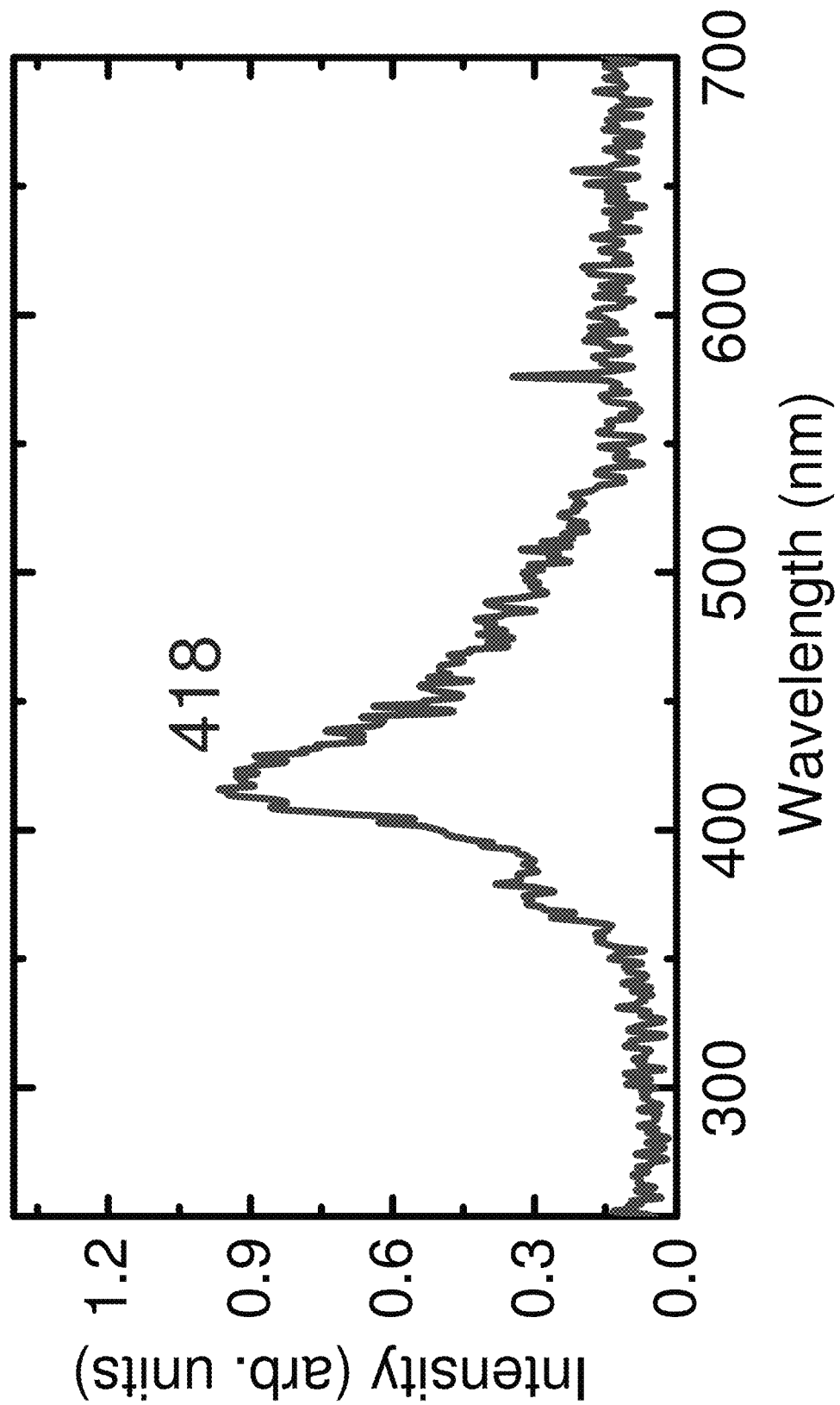
FIG. 11 shows the emission spectrum of a $Tl_3LaBr_6$:Ce scintillator material sample.

A $Tl_3LaBr_6$:Ce crystal was grown. Various scintillator properties were measured using the sample. FIG. 11 shows the emission spectrum of the $Tl_3LaBr_6$:Ce scintillator material sample. The results show that $Tl_3LaBr_6$:Ce has attractive scintillation properties.

Example 4

This example illustrates production and characterization of a $Tl_2(Li_{0.5}Na_{0.5})BiBr_6$:Ce scintillator material sample.

Figure 12:
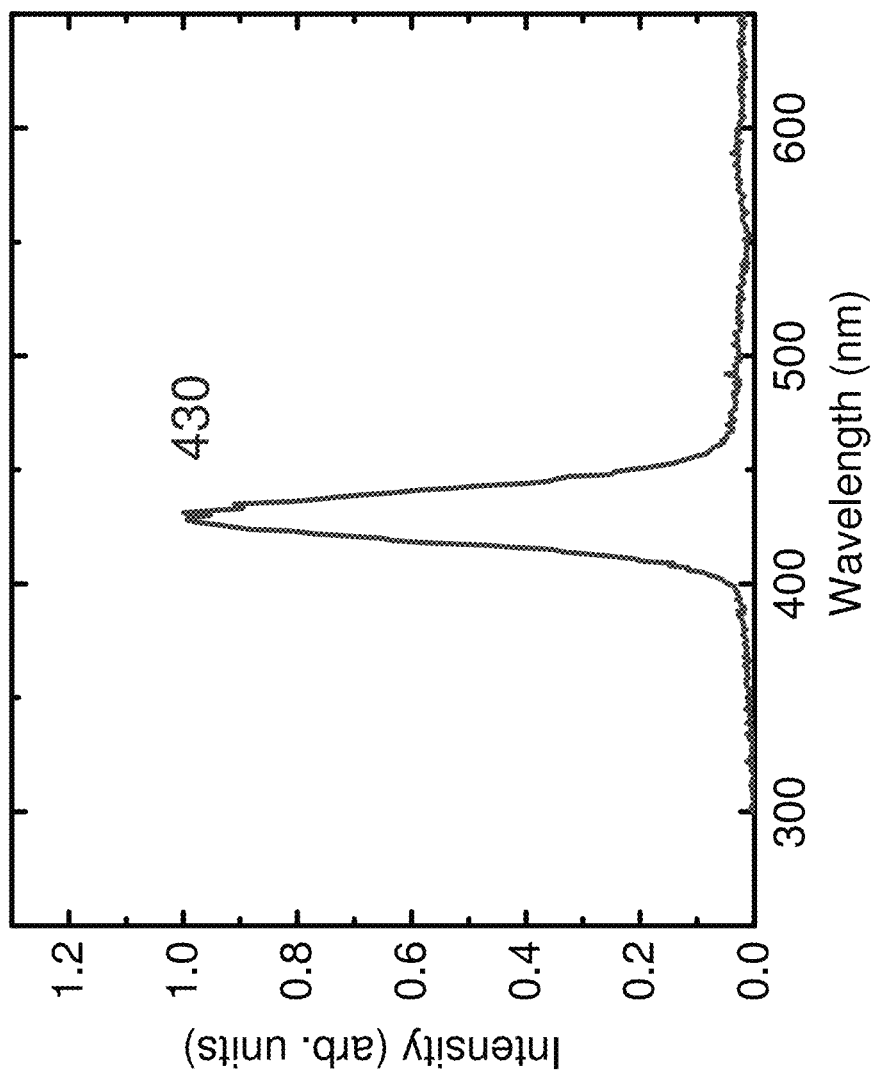
FIG. 12 shows the emission spectrum of a $Tl_2(Li_{0.5}Na_{0.5})BiBr_6$:Ce scintillator material sample.
Figure 13:
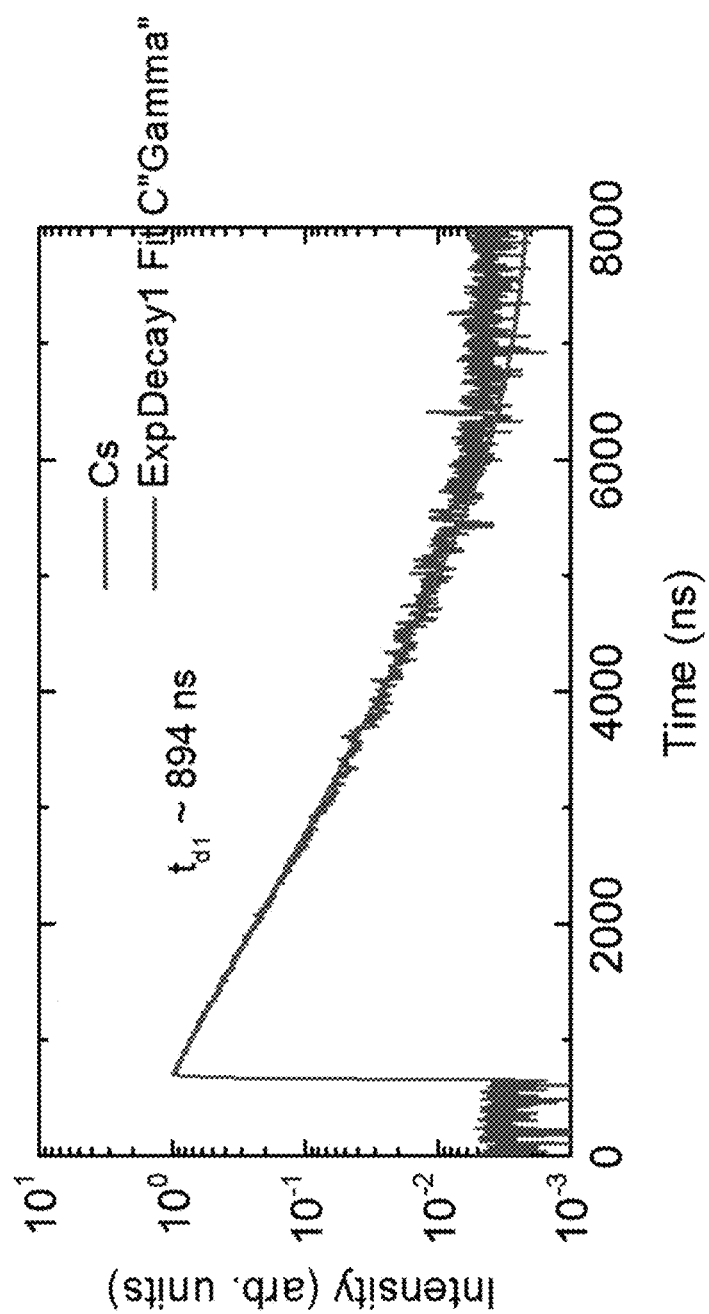
FIG. 13 shows the decay time of a $Tl_2(Li_{0.5}Na_{0.5})BiBr_6$:Ce scintillator material sample.
Figure 14:
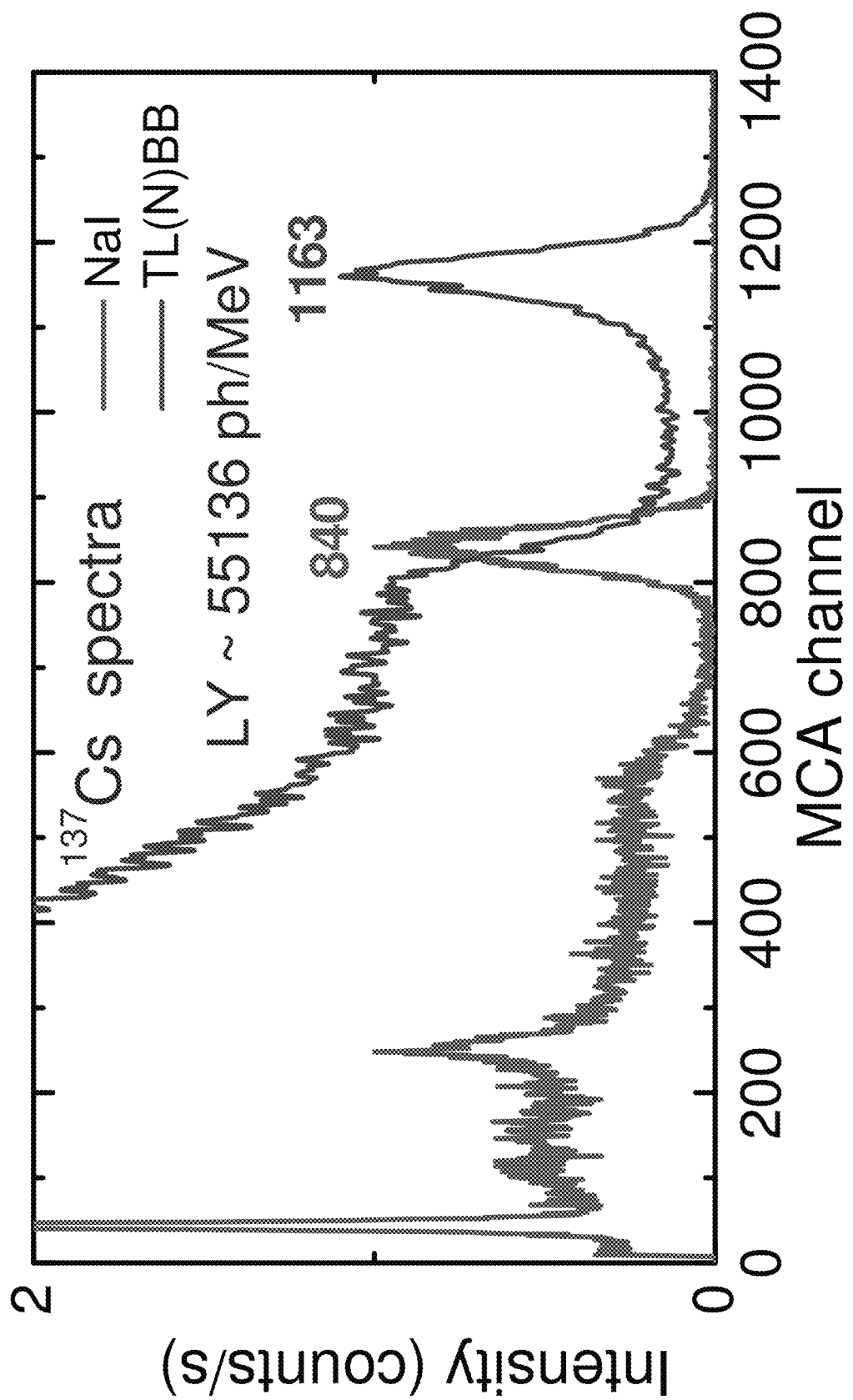
FIG. 14 shows light output and energy resolution of a $Tl_2(Li_{0.5}Na_{0.5})BiBr_6$:Ce sample compared to NaI scintillator material.

A $Tl_2(Li_{0.5}Na_{0.5})BiBr_6$:Ce crystal was grown. Various scintillator properties were measured using the sample. FIG. 12 shows the emission spectrum of the $Tl_2(Li_{0.5}Na_{0.5})BiBr_6$:Ce scintillator material sample. FIG. 13 shows the decay time of the $Tl_2(Li_{0.5}Na_{0.5})BiBr_6$:Ce scintillator material sample. FIG. 14 shows light output and energy resolution of a $Tl_2(Li_{0.5}Na_{0.5})BiBr_6$:Ce sample compared to NaI scintillator material.

The results show that $Tl_2(Li_{0.5}Na_{0.5})BiBr_6$:Ce has attractive scintillation properties.

Example 5

This example illustrates production and characterization of a $TlSr_2I_5$:Eu scintillator material sample.

Figure 15:
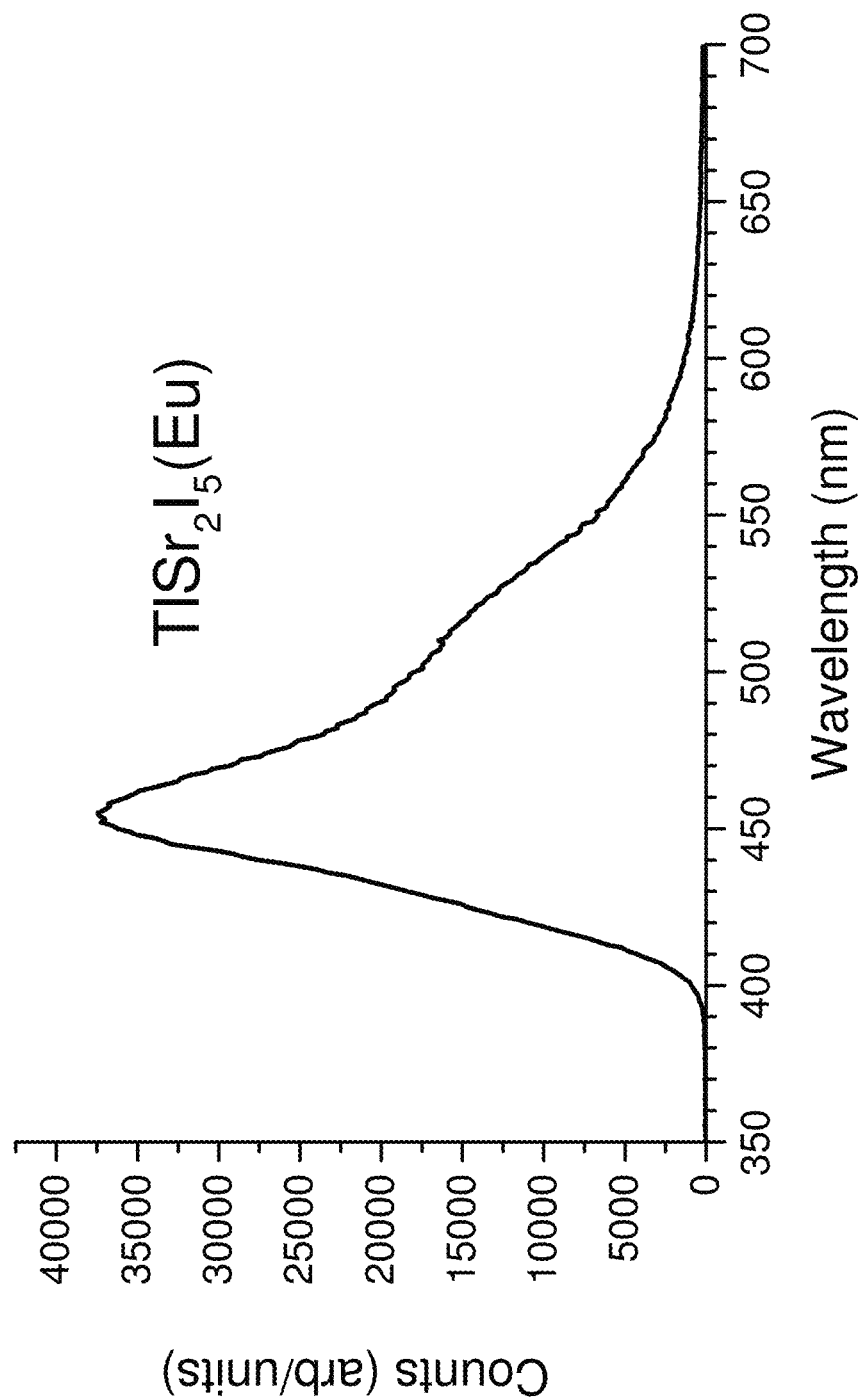
FIG. 15 shows the emission spectrum of a $TlSr_2I_5$:Eu scintillator material sample.

A $TlSr_2I_5$:Eu was grown. Various scintillator properties were measured using the sample. FIG. 15 shows the emission spectrum of the $TlSr_2I_5$:Eu scintillator material sample. The results show that $TlSr_2I_5$:Eu has attractive scintillation properties.

Example 6

This example illustrates production and characterization of a $Tl_2HfCl_6$:Ce scintillator material sample.

Figure 16A:
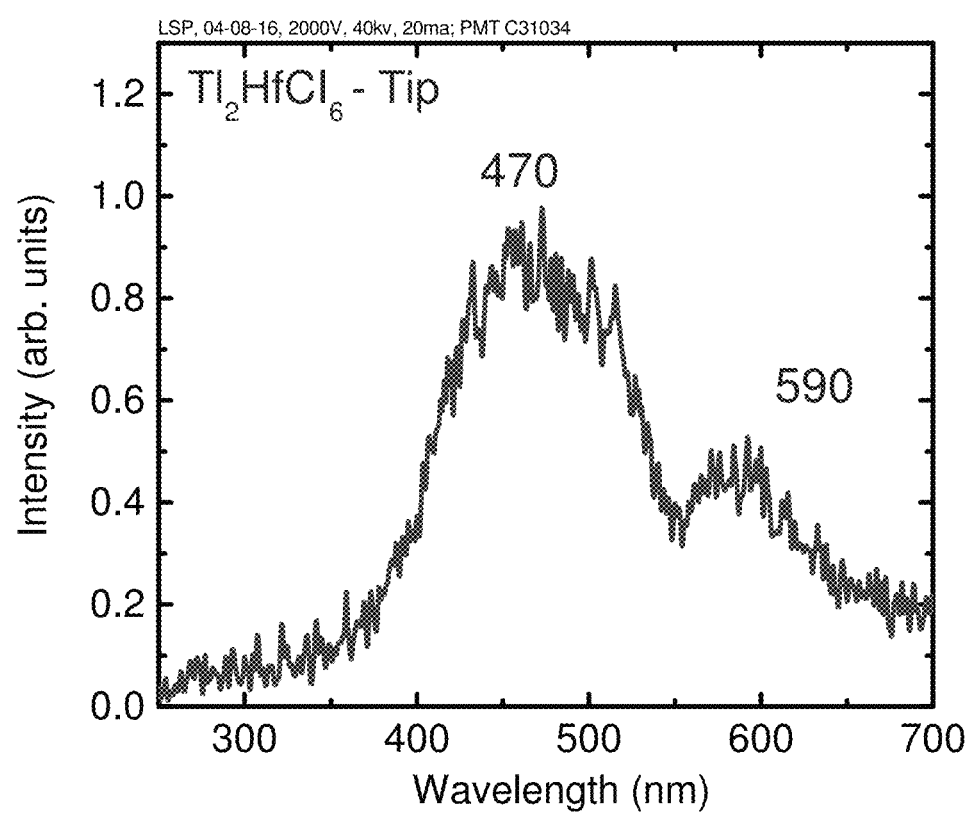
FIG. 16A shows the emission spectrum of a $Tl_2HfCl_6$:Ce scintillator material sample.
Figure 16B:
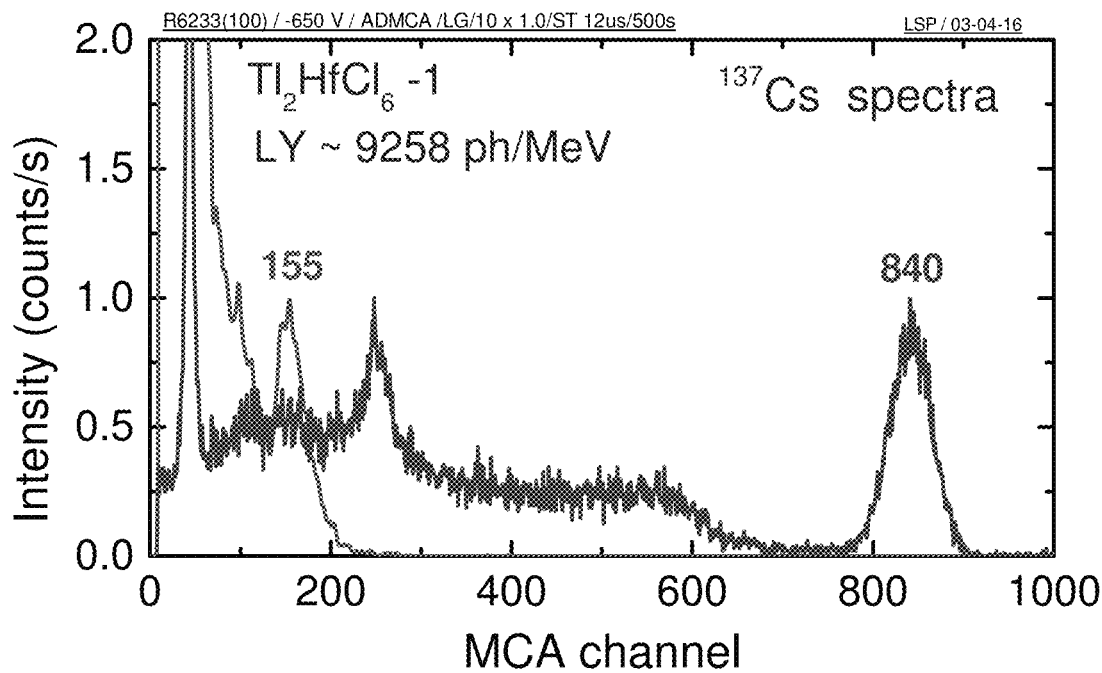
FIG. 16B shows light output and energy resolution of a $Tl_2HfCl_6$:Ce scintillator material sample.
Figure 16C:
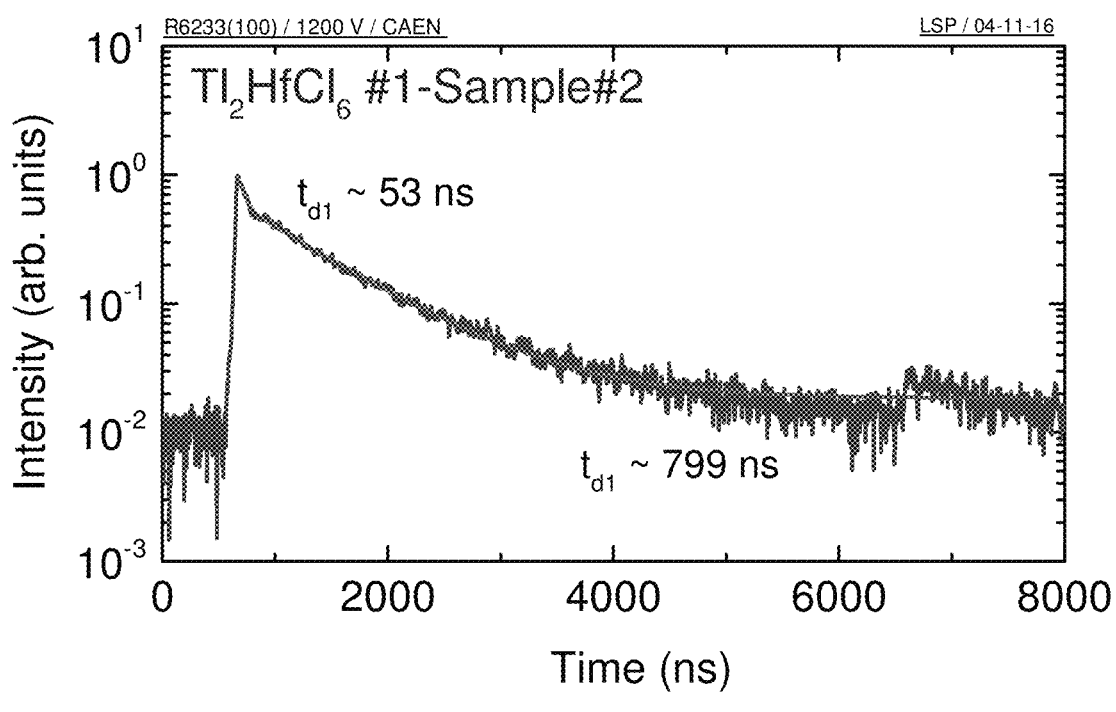
FIG. 16C shows decay time of a $Tl_2HfCl_6$:Ce scintillator material sample.

A $Tl_2HfCl_6$:Ce crystal was grown. Various scintillator properties were measured using the sample. FIG. 16A shows the emission spectrum of the $Tl_2HfCl_6$:Ce scintillator material sample. FIG. 16B shows light output and energy resolution of the $Tl_2HfCl_6$:Ce scintillator material sample. FIG. 16C shows decay time of the $Tl_2HfCl_6$:Ce scintillator material sample.

The results show that $Tl_2HfCl_6$:Ce has attractive scintillation properties.

Example 7

This example illustrates production and characterization of a $Tl_2HfI_6$:Ce scintillator material sample.

Figure 17A:
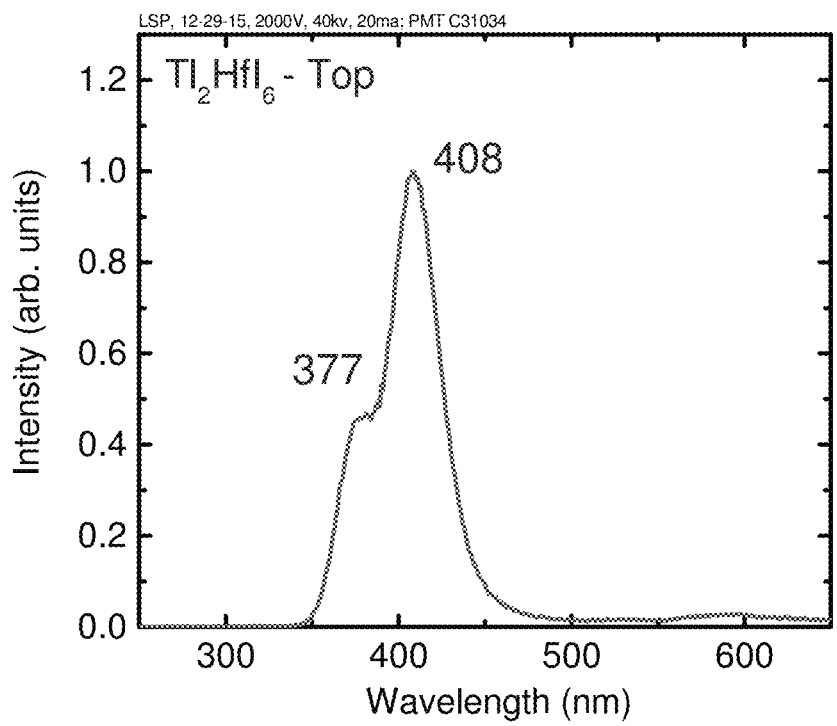
FIG. 17A shows the emission spectrum of a $Tl_2HfI_6$:Ce scintillator material sample.
Figure 17B:
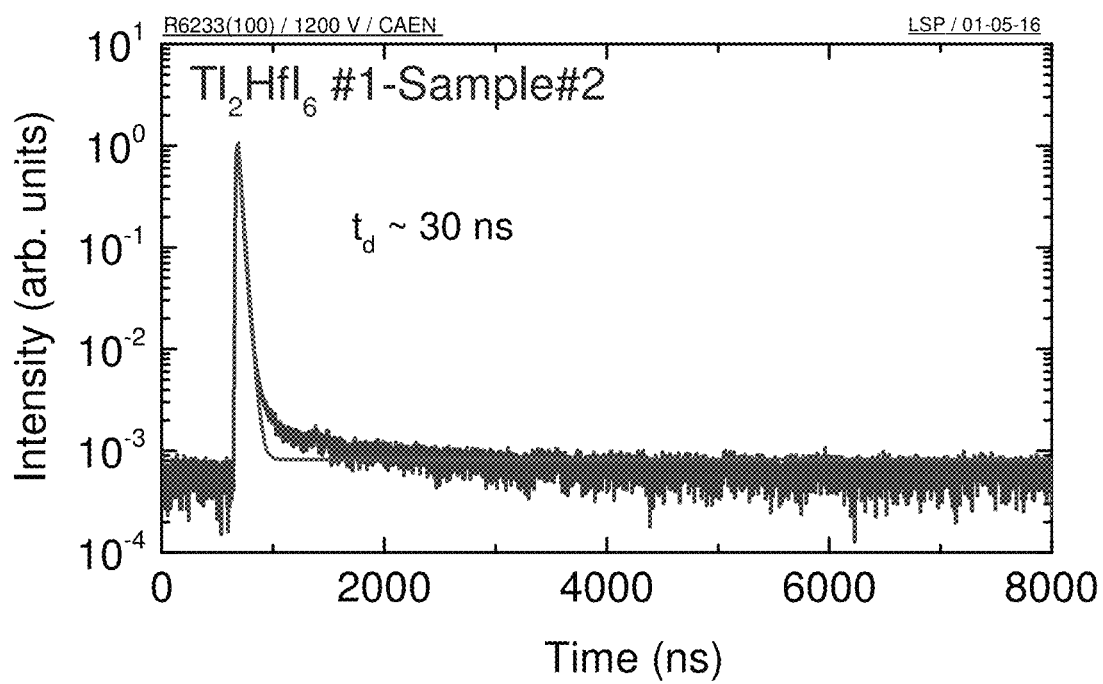
FIG. 17B shows decay time of a $Tl_2HfI_6$:Ce scintillator material sample.

A $Tl_2HfI_6$:Ce crystal was grown. Various scintillator properties were measured using the sample. FIG. 17A shows the emission spectrum of the $Tl_2HfI_6$:Ce scintillator material sample. FIG. 17B shows decay time of the $Tl_2HfI_6$:Ce scintillator material sample.

The results show that $Tl_2HfI_6$:Ce has attractive scintillation properties.

Example 8

This example illustrates production and characterization of a $Tl_2LiYCl_6$:Ce scintillator material sample.

Figure 18A:
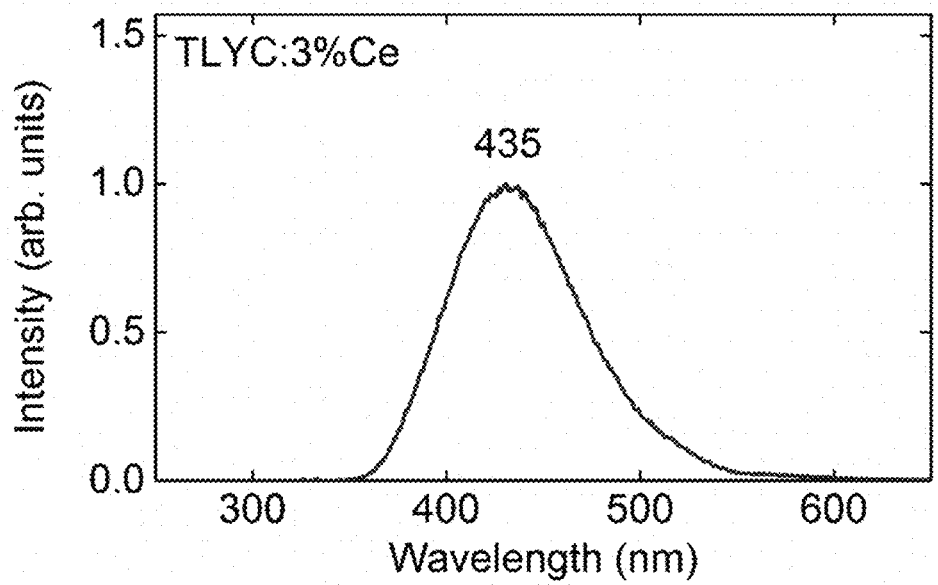
FIG. 18A shows the emission spectrum of a $Tl_2LiYCl_6$:Ce scintillator material sample.
Figure 18B:
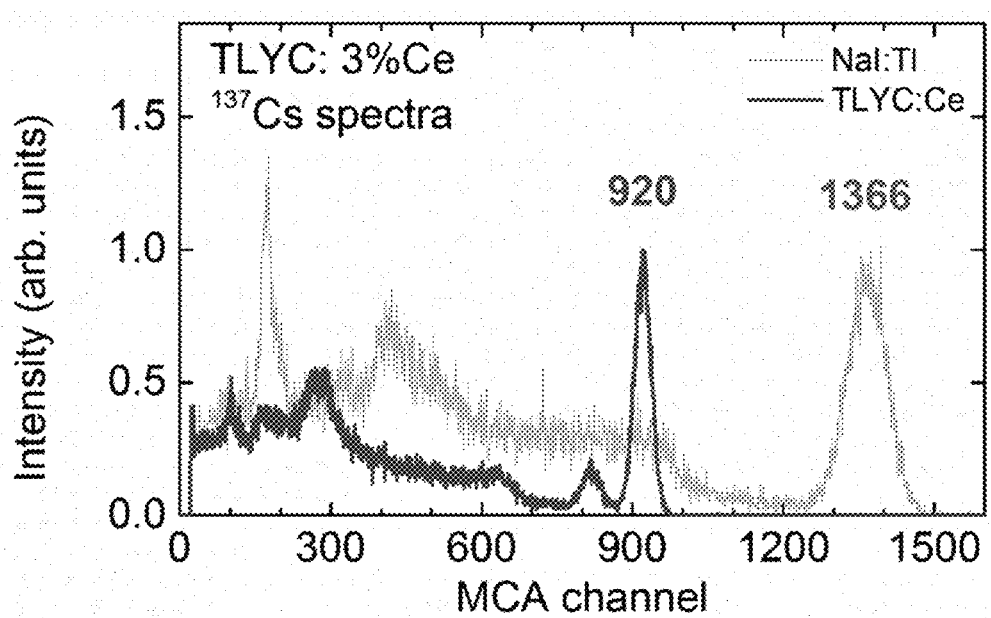
FIG. 18B shows light output and energy resolution of a $Tl_2LiYCl_6$:Ce scintillator material sample.
Figure 18C:
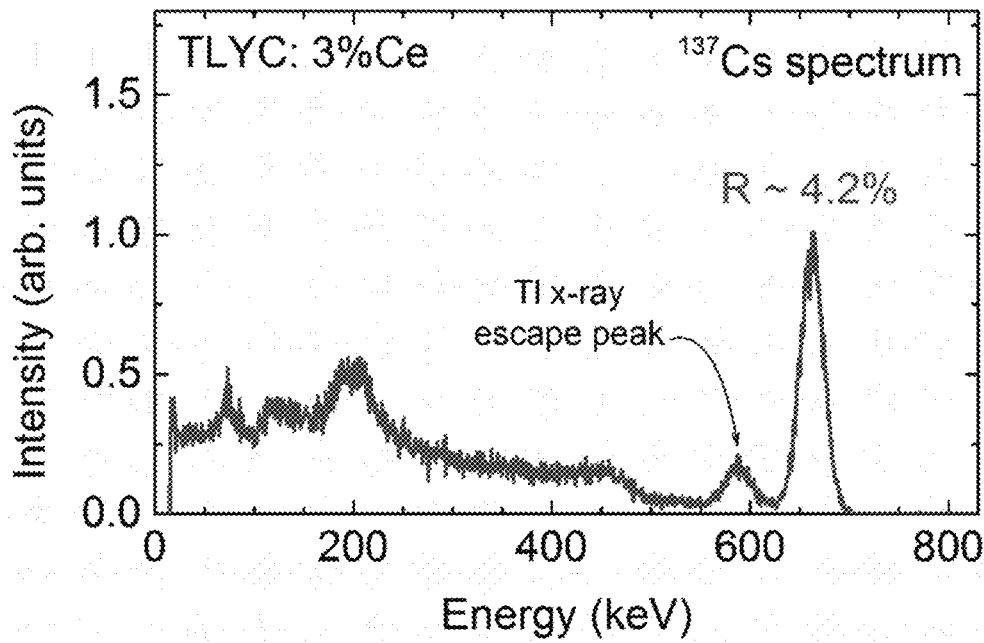
FIG. 18C shows light yield of a $Tl_2LiYCl_6$:Ce scintillator material sample.
Figure 18D:
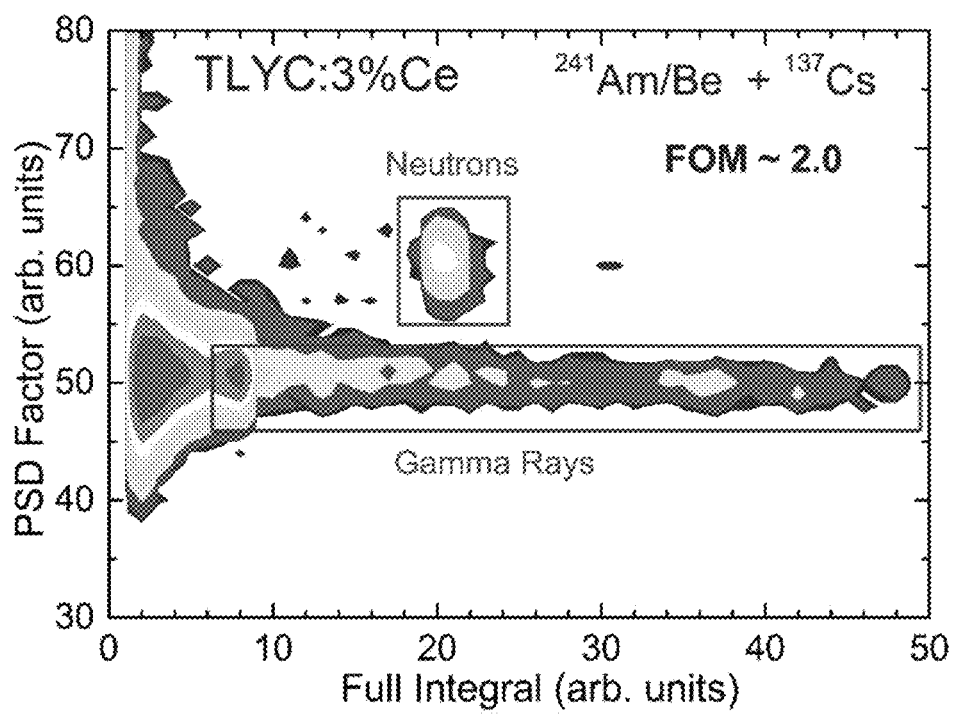
FIG. 18D shows differentiation of gamma ray detection and neutron detection using pulse shape discrimination (PSD) by a $Tl_2LiYCl_6$:Ce scintillator material sample.

A $Tl_2LiYCl_6$:Ce crystal was grown. Various scintillator properties were measured using the sample. FIG. 18A shows the emission spectrum of the $Tl_2LiYCl_6$:Ce scintillator material sample. FIG. 18B shows light output and energy resolution of the $Tl_2LiYCl_6$:Ce scintillator material sample. FIG. 18C shows light yield of a $Tl_2LiYCl_6$:Ce scintillator material sample. FIG. 18D shows differentiation of gamma ray detection and neutron detection using pulse shape discrimination (PSD) by the $Tl_2LiYCl_6$:Ce scintillator material sample.

The results show that $Tl_2LiYCl_6$:Ce has attractive scintillation properties.

Example 9

This example illustrates production and characterization of a $Tl_2(Li_{0.5}Na_{0.5})BiBr_6$:Ce scintillator material sample.

Figure 19A:
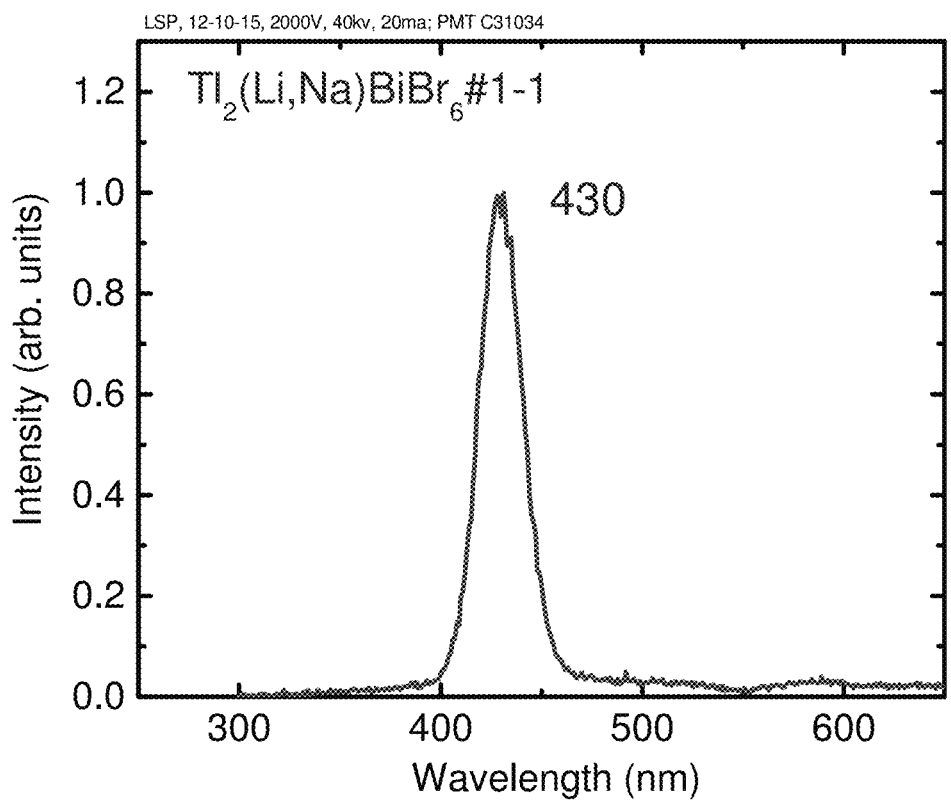
FIGS. 19A-19B show the emission spectrum of a $Tl_2TlLaBr_6$:Ce (or $Tl_3LaBr_6$:Ce) scintillator material sample.
Figure 19B:
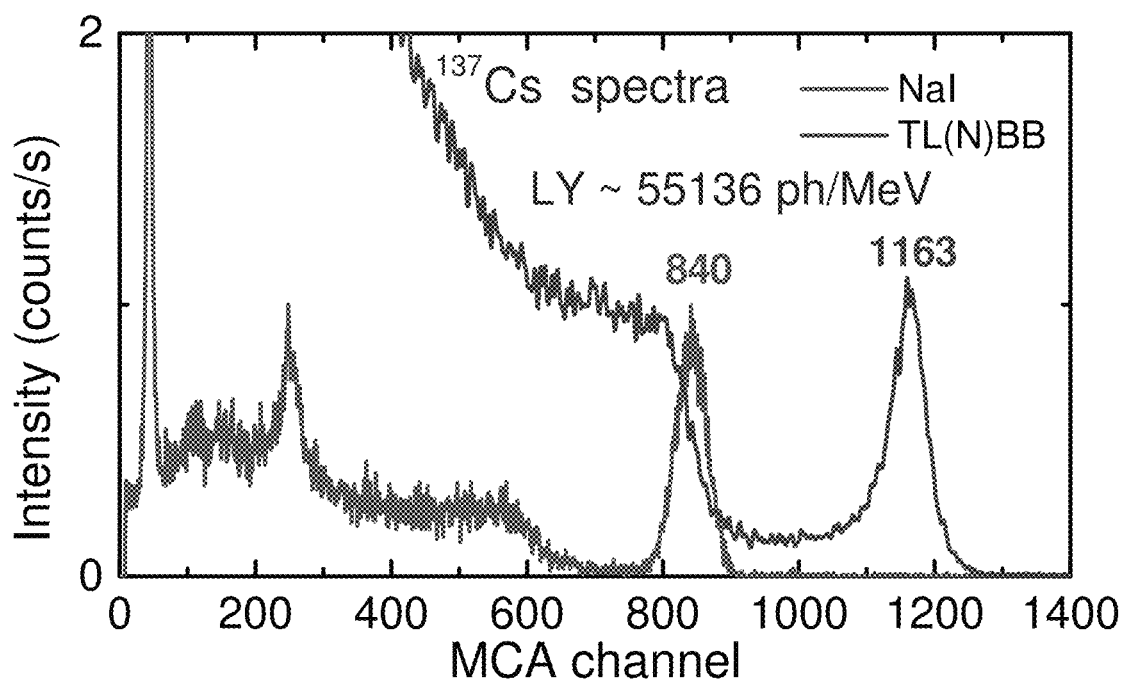

A $Tl_2(Li_{0.5}Na_{0.5})BiBr_6$:Ce crystal was grown. Various scintillator properties were measured using the sample. FIG. 19A shows the emission spectrum of the $Tl_2(Li_{0.5}Na_{0.5})$ $BiBr_6$:Ce scintillator material sample. FIG. 19B shows light output and energy resolution of the $Tl_2(Li_{0.5}Na_{0.5})BiBr_6$:Ce scintillator material sample.

The results show that $Tl_2(Li_{0.5}Na_{0.5})BiBr_6$:Ce has attractive scintillation properties.

Example 10

This example illustrates production and characterization of a $Tl_2LiLa(Br_{0.5}Cl_{0.5})_6$:Ce scintillator material sample.

Figure 20A:
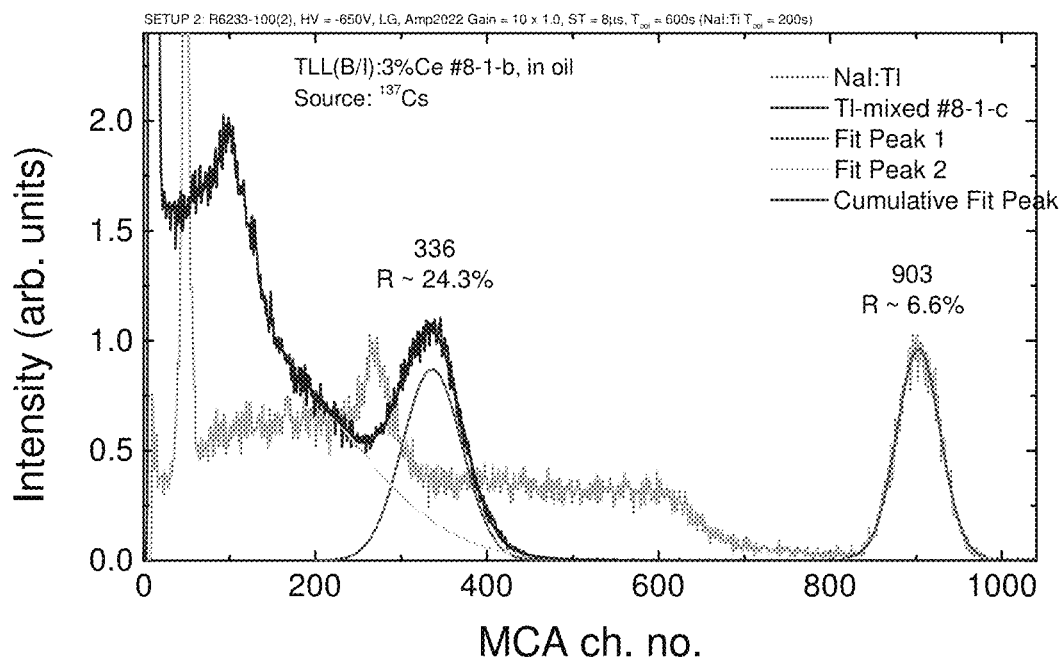
FIGS. 20A-20B show the emission spectrum of a Tl$_2$LaBr$_5$:Ce scintillator material sample.
Figure 20B:
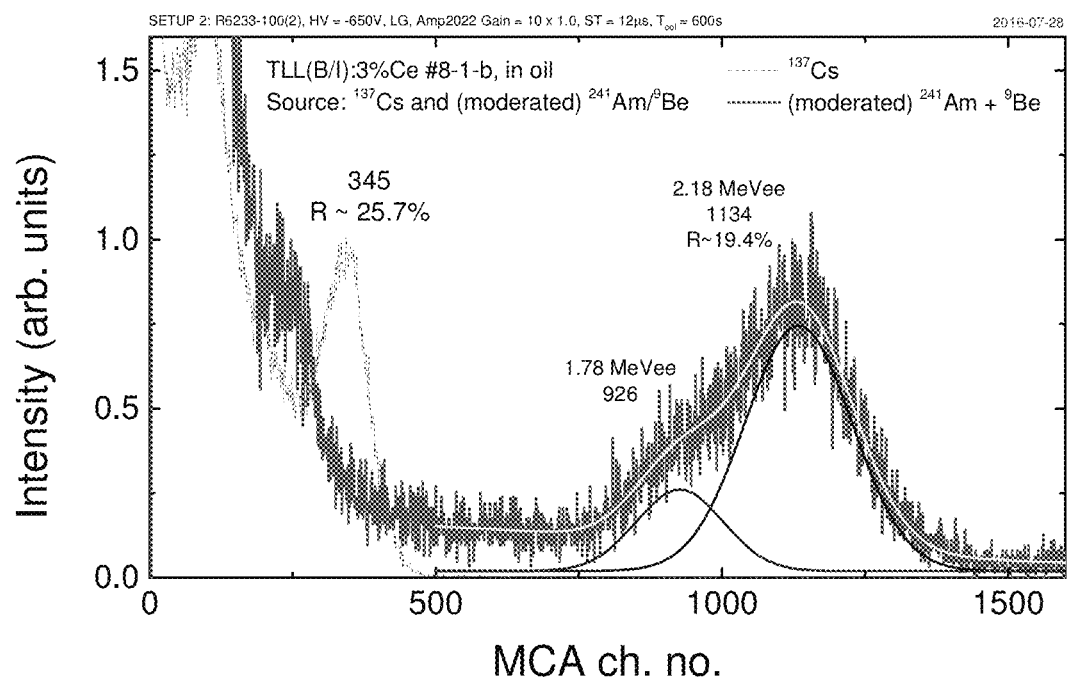

A $Tl_2LiLa(Br_{0.5}Cl_{0.5})_6$:Ce crystal was grown. Various scintillator properties were measured using the sample. FIGS. 20A and 20B show light output and energy resolution of the $Tl_2LiLa(Br_{0.5}Cl_{0.5})_6$:Ce scintillator material sample.

The results show that $Tl_2LiLa(Br_{0.5}Cl_{0.5})_6$:Ce has attractive scintillation properties.

Example 11

This example illustrates production and characterization of a $Tl_2TlLaBr_6$:Ce (or $Tl_3LaBr_6$:Ce) scintillator material sample.

Figure 21:
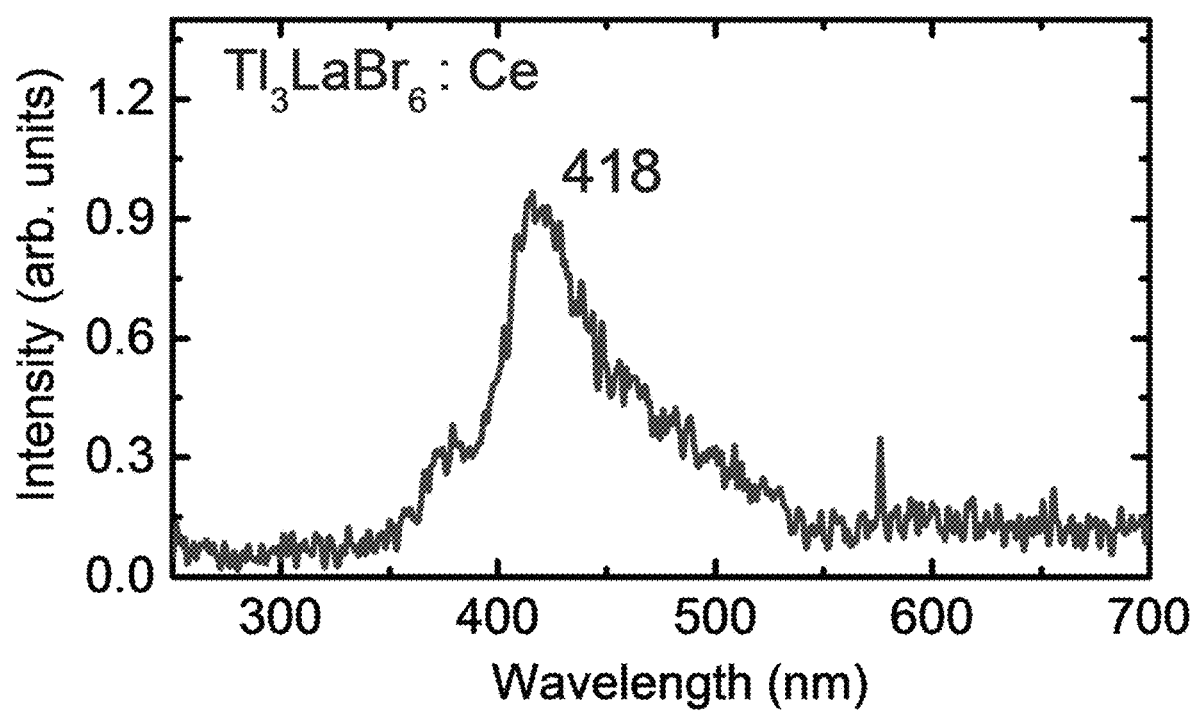
FIG. 21 shows the emission spectrum of the Tl$_2$TlLaBr$_6$:Ce (or Tl$_3$LaBr$_6$:Ce) scintillator material sample.

A $Tl_2TlLaBr_6$:Ce (or $Tl_3LaBr_6$:Ce) crystal was grown. Various scintillator properties were measured using the sample. FIG. 21 shows the emission spectrum of the $Tl_2TlLaBr_6$:Ce (or $Tl_3LaBr_6$:Ce) scintillator material sample.

The results show that $Tl_2TlLaBr_6$:Ce (or $Tl_3LaBr_6$:Ce) has attractive scintillation properties.

Example 12

This example illustrates production and characterization of a $Tl_2LaBr_5$:Ce scintillator material sample.

Figure 22:
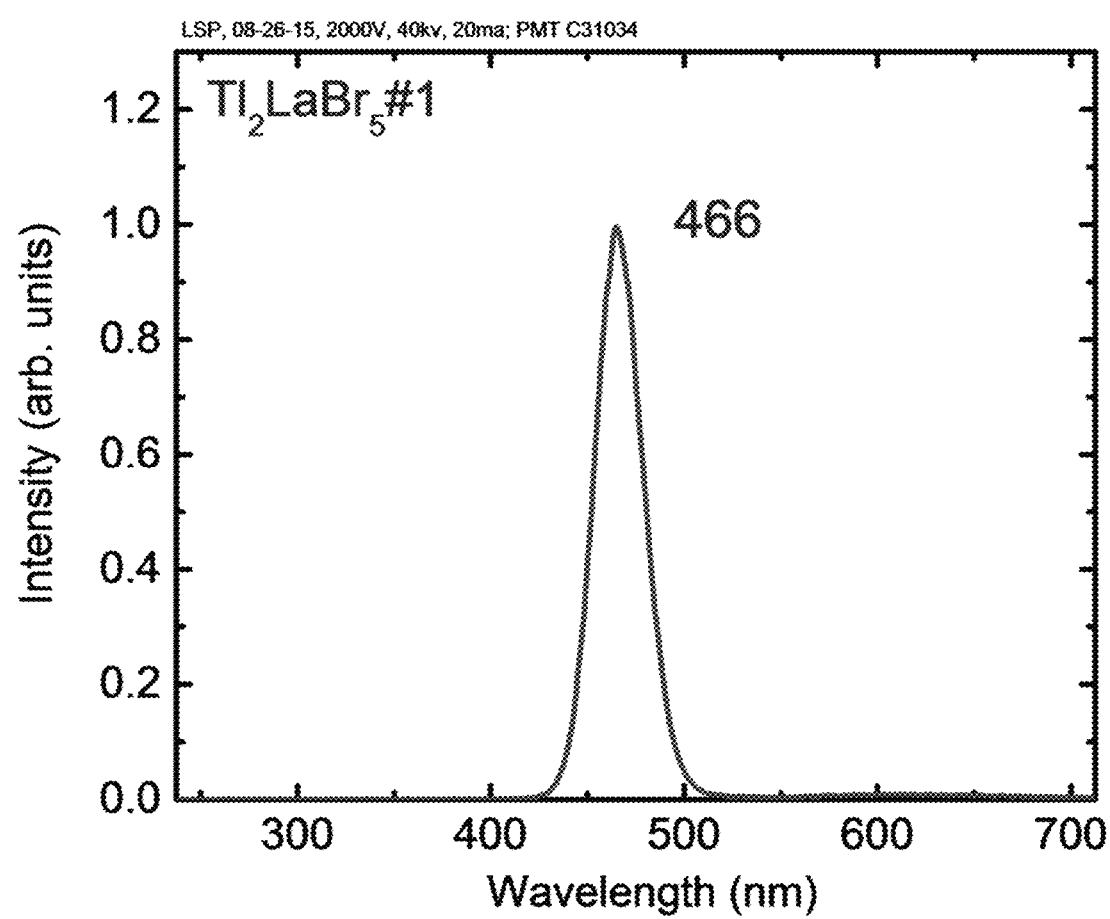
FIG. 22 shows the emission spectrum of the Tl$_2$LaBr$_5$:Ce scintillator material sample.

A $Tl_2LaBr_5$:Ce crystal was grown. Various scintillator properties were measured using the sample. FIG. 22 shows the emission spectrum of the $Tl_2LaBr_5$:Ce scintillator material sample.

The results show that $Tl_2LaBr_5$:Ce has attractive scintillation properties.

What is claimed is:

1. A method of radiation detection, comprising:
providing a detection system including a scintillator material and a detector assembly coupled to the scintillator material and configured to detect a light pulse luminescence from the scintillator material as a measure of a scintillation event, wherein the scintillator material comprises a thallium-based halide composition, wherein the thallium-based halide composition has the general formula of $Tl_2LiYCl_6$;
positioning the system such that a radiation source is within a field of view of the system so as to detect emissions from the source; and
measuring a scintillation event luminescence signal from the scintillator with the detection assembly,
wherein the source emits gamma-rays and neutrons and the method further comprises differentiating gamma-ray detection and neutron detection using pulse shape discrimination (PSD) analysis.

2. The method of claim 1, further comprising a dopant.

3. The method of claim 1, further comprising one or more dopants selected from the group consisting of Ce, Pr, Eu, Sr, Ca, Ba, Mg, and Cd.

4. The method of claim 1, further comprising Ce as a dopant.

5. The method of claim 1, wherein the density of the composition is greater than 4 g/cm$^3$.

* * * * *